United States Patent
Gretz

(10) Patent No.: US 7,161,095 B1
(45) Date of Patent: Jan. 9, 2007

(54) ELECTRICAL FITTING FOR SNAP IN CONNECTION OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/494,663

(22) Filed: Jul. 27, 2006

Related U.S. Application Data

(63) Continuation-in-part of application No. 11/300,859, filed on Dec. 15, 2005.

(51) Int. Cl.
*H02G 3/18* (2006.01)

(52) U.S. Cl. ............. 174/655; 174/653; 174/659; 174/668; 174/135; 174/152 G; 16/2.1; 439/552

(58) Field of Classification Search ........ 174/650–669, 174/152 G, 153 G, 135, 151, 59, 60–61; 439/552, 557, 142; 16/2.1; 248/56; 285/194, 285/921

See application file for complete search history.

(56) References Cited

U.S. PATENT DOCUMENTS

| | | | | |
|---|---|---|---|---|
| 4,324,503 A | * | 4/1982 | Sevrence | 403/197 |
| 5,171,164 A | * | 12/1992 | O'Neil et al. | 439/552 |
| 5,373,106 A | * | 12/1994 | O'Neil et al. | 174/669 |
| 6,080,933 A | * | 6/2000 | Gretz | 174/668 |
| 6,335,488 B1 | * | 1/2002 | Gretz | 174/372 |
| 6,521,831 B1 | | 2/2003 | Gretz | |
| 7,045,714 B1 | | 5/2006 | Kiely | |
| 7,057,107 B1 | | 6/2006 | Auray et al. | |
| 7,064,272 B1 | | 6/2006 | Auray et al. | |

* cited by examiner

Primary Examiner—Dhiru R. Patel

(57) ABSTRACT

A duplex electrical fitting having an improved arrangement on the trailing end for attaching electrical cables thereto. A connector body includes a leading opening, a midportion, two trailing openings, and a sidewall. Two open channels are provided in the sidewall on the trailing end of the connector, one open channel into each trailing opening. Each of the open channels extends from the trailing opening to the midportion of the connector body. Each of the channels includes a bridge adjacent the trailing opening which bridges each of the open channels. Each of the bridges is adapted to receive a tandem tang secured thereto. The tandem tangs include a common middle section and a leading tang and a trailing tang extending therefrom. Cable grabbing ends are provided on both the leading and trailing tangs. The leading and trailing tangs extend from outward of the connector body into the open channel. The tangs are of substantial length and are cantilevered over such a distance so as to enable easy insertion of cable within the trailing opening. The open channel permits additional space for flexing of the tangs of the tandem tang to further ease insertion of cables into the fitting. Bend lines on the leading and trailing tangs direct the cable grabbing ends toward an inserted cable and thereby hold the cable against the bottom of the open channel.

23 Claims, 24 Drawing Sheets

ELECTRICAL FITTING FOR SNAP IN CONNECTION OF CABLES

This application is a Continuation-In-Part of U.S. patent application Ser. No. 11/300,859 filed Dec. 15, 2005 and still pending.

FIELD OF THE INVENTION

This invention relates to fittings for connecting electrical cables to a panel or an electrical box and specifically to a duplex electrical fitting having an improved arrangement on the trailing end for receiving electrical cables.

BACKGROUND OF THE INVENTION

Several prior art connectors have been proposed for the attachment of electrical cables to panels or electrical boxes. Some of these include a tubular body with a cavity on the trailing end and a split ring that is inserted within the cavity. Typically the split ring includes one or more cable gripping tangs for securing a cable to the trailing end of the connector. As a result of the limited space within the cavity, the length of the cable gripping tangs is limited. Thus the cable gripping tangs must be relatively short, making the tangs stiff and less flexible, which translates to a higher than desired amount of force required to insert a cable into the trailing end of the electrical connector.

An electrical fitting having an improved arrangement on the trailing end for the attachment of electrical cables was disclosed in co-pending U.S. application Ser. No. 11/300,859, which is commonly owned by the assignee of the present invention and the contents of which are incorporated herein in their entirety by reference thereto. Instead of the split ring being located within the tubular body as shown in the prior art, the improved arrangement included single or tandem cable gripping tangs that are fastened externally to the tubular body and therefore are easily accessible.

The present invention provides a duplex electrical fitting that incorporates the several advantages of the electrical fitting of U.S. application Ser. No. 11/300,859. The duplex electrical fitting includes increased space to allow enhanced flexing of the cable gripping tangs. With the duplex fitting of the present invention, the movement of the cable gripping tangs is much less restricted when a cable is secured thereto to the trailing end of the connector. The duplex electrical connector of the present invention thereby enables easier insertion of electrical cables to the trailing end of the connector and thereby enables the electrical fitting to accommodate a wider range of cable sizes.

SUMMARY OF THE INVENTION

The invention is a duplex electrical fitting having an improved arrangement on the trailing end for attaching electrical cables thereto. A connector body includes a leading opening, a midportion, two trailing openings, and a sidewall. Two open channels are provided in the sidewall on the trailing end of the connector, one open channel into each trailing opening. Each of the open channels extends from the trailing opening to the midportion of the connector body. Each of the channels includes a bridge adjacent the trailing opening which bridges each of the open channels. Each of the bridges is adapted to receive a tandem tang secured thereto. The tandem tangs include a common middle section and a leading tang and a trailing tang extending therefrom. Cable grabbing ends are provided on both the leading and trailing tangs. The leading and trailing tangs extend from outward of the connector body into the open channel. The tangs are of substantial length and are cantilevered over such a distance so as to enable easy insertion of cable within the trailing opening. The open channel permits additional space for flexing of the tangs of the tandem tang to further ease insertion of cables into the fitting. Bend lines on the leading and trailing tangs direct the cable grabbing ends toward an inserted cable and thereby hold the cable against the bottom of the open channel.

OBJECTS AND ADVANTAGES

Several advantages are achieved with the electrical fitting of the present invention, including:

(1) The fitting will typically accommodate cables of multiple trade sizes. This enables a few sizes of fittings to accommodate the entire range of standard cable sizes available and therefore reduces stocking requirements of the fittings.
(2) The fitting includes gripping members that are located external to the tubular body, thereby permitting longer gripping members that allow insertion of cables with less force than is typically required in prior art fittings.
(3) The increased length of the gripping members permits them to be cantilevered over a greater distance, thereby increasing their flexibility and enabling easier insertion of cables.
(4) An internal ring with gripping members is not required, thereby simplifying the production of the fitting and reducing the cost of manufacture.
(5) As a result of the increased length and flexibility of the gripping members, cables can easily be released when such is desired.
(6) As a result of the large leading opening and the attachment of the tandem tangs on the exterior of the duplex electrical fitting, a straight-through path is available for insertion of each of the two cables. Prior art fittings utilizing frustoconical snap rings greatly reduce the diameter of the leading opening thereby causing an obstruction to any cables being inserted therein as a result of the necked down shoulder and the small leading opening.

These and other objects and advantages of the present invention will be better understood by reading the following description along with reference to the drawings.

Figure 1:
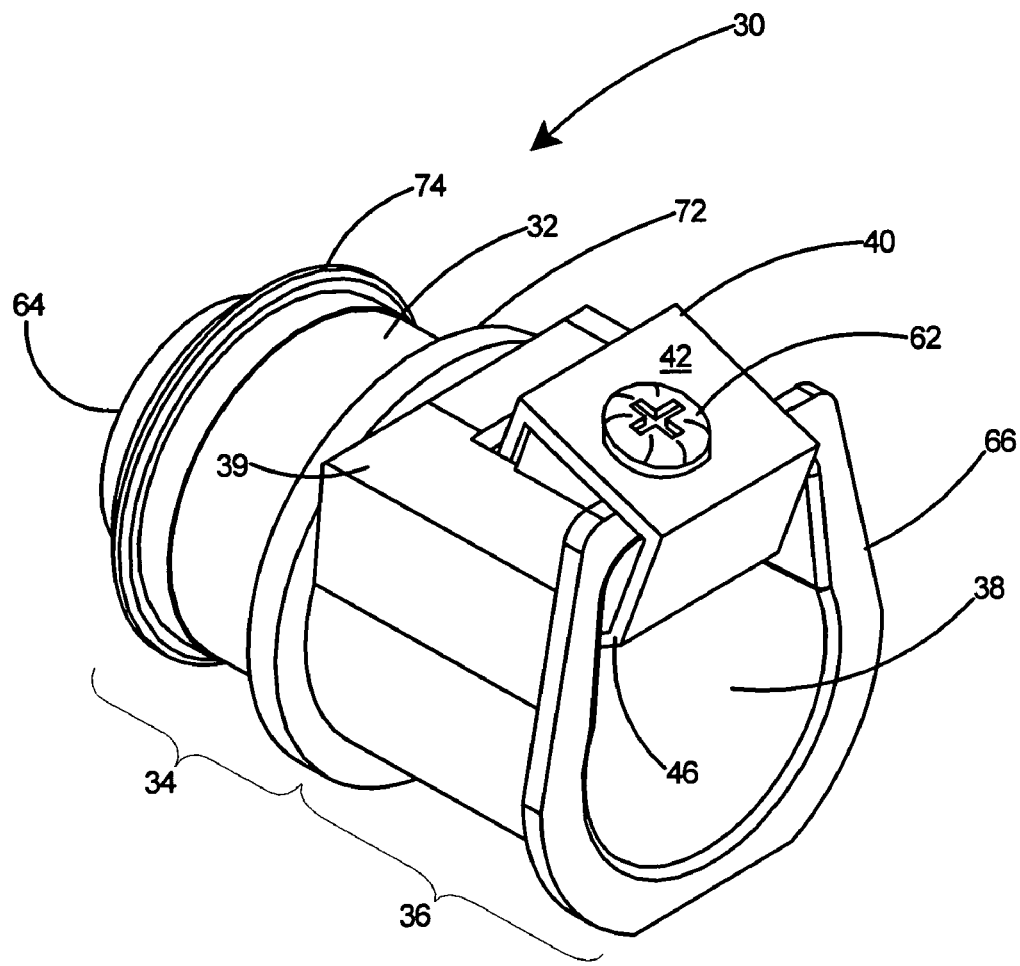
FIG. 1 is a perspective view from the trailing end of an electrical fitting according to the present invention.

INDEX TO REFERENCE NUMERALS IN DRAWINGS 30 electrical fitting
32 tubular body
34 leading portion
36 trailing portion
38 bore
39 raised area of tubular body
40 clip member
42 base portion
44 central axis
45 cylindrical volume
46 leg
46A first leg
46B second leg
47 cavity
48 cantilever point
50 end portion of leg
52 top portion of leg
54 intermediate portion of leg
56 aperture in clip member
58 aperture in tubular body
60 opening
62 fastener
64 leading end
66 trailing end
68 top wall of trailing portion
70 top wall of leading portion
72 central flange
74 end flange of tubular body
76 thick wall section
78 partial closure
80 opening in partial closure
82 edge
84 insert 86 end flange of insert
88 smooth seat
90 necked-down nose section
91 center bore of insert
92 outer sheath
93 peak
94 groove
96 first cable
98 second cable
100 lower end of leg
102 semicircular notch
104 blank
106 bend line
110 electrical fitting
112 connector body
114 leading end of connector body
116 trailing end of connector body
118 intermediate flange
120 leading opening
122 trailing opening
124 tandem tang
126 fastener
128 open channel
130 bottom of open channel
132 bridge
133 outwardly extending ramp
134 inclined surface of bridge
136 aperture in inclined surface
138 bore
140 leading tang
142 trailing tang
144 common middle section
146 cable grabbing end
148 aperture in common middle section
150 first right angle bend
154 second right angle bend
158 bend line
200 duplex electrical fitting
202 connector body
204 leading end of connector body
206 trailing end of connector body
208 sidewall
210 leading opening
212 trailing opening
214 open channel
216 midportion of connector body
217 cylindrical nose portion
218 bottom of open channel
220 bridge
222 outwardly extending ramp
224 inclined surface
226 tandem tang
227 electrical cable
228 blank
229 second bend line
230 first end leg
232 second end leg
234 leading body portion
236 trailing body portion
238 flange on trailing body portion
240 forward nose
242 leading edge of trailing body portion
244 aperture
246 forward view port
248 trailing edge of leading body portion
250 skirt
252 rearward view ports
254 midsection of leading body portion
256 forward flange
258 boss
260 threaded aperture
262 fastener
264 wall
266 pair of openings in wall
268 cavity in skirt
269 longitudinal wall
270 snap ring
272 fastener
274 cable axis
278 groove in cable
280 electrical leads or wires
282 electrical panel
284 alternative attachment arrangement
286 threaded nose portion
288 locknut
D1 outer dimension of the intermediate flange
θ angle of intermediate portion of leg with respect to central axis
$\theta_1$ bend angle of first leg
$\theta_2$ bend angle of second leg
$\theta_3$ angle between first and second leg
$\theta_4$ angle of tang with respect to the cable axis

DETAILED DESCRIPTION OF THE INVENTION

With reference to FIG. 1 there is shown a first embodiment of the present invention, an electrical fitting 30 having an improved arrangement for the securing of electrical cables thereto. The electrical fitting 30 includes a continuous tubular body 32 including a leading portion 34, a trailing portion 36, and a bore 38. A raised area 39 extends in one direction from the tubular body 32. Secured externally to the trailing portion 36 of the tubular body 32 is a clip member 40, with the clip member 40 including a base portion 42 at which it is secured to the tubular body 32.

Figure 16:
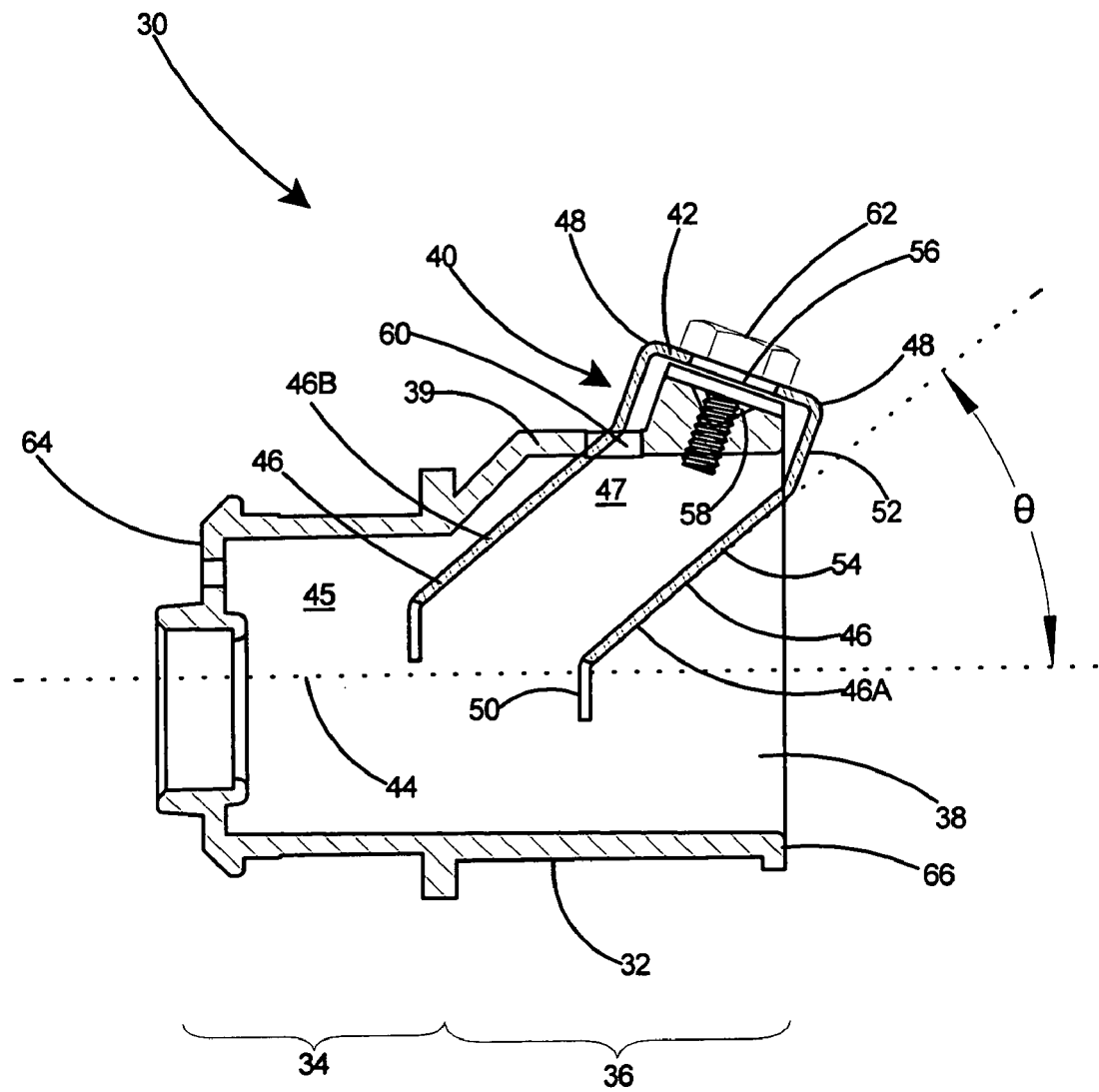
FIG. 16 is a sectional view of the electrical fitting of FIG. 1.

Referring to FIG. 16, the bore 38 of the tubular body 32 includes a central axis 44 defined by the leading portion 34. The central axis 44 of the bore 38 is the axial center of the leading portion 34. A cylindrical volume 45 surrounds the central axis 44 within the leading portion 34. Within the raised area 39 of the trailing portion 36 is a cavity 47. The cavity 47 provides additional volume between the raised area 39 and the central axis 44 and thereby creates a larger volume within the trailing portion 36 than the cylindrical volume 45 of the leading portion 34. At least one leg 46 extends from the base portion 42 of the clip member 40. The leg 46 extends from the raised area 39 of the tubular body 32 into the bore 38. The leg 46 is cantilevered from a point 48 exterior of the tubular body 32, which is the cantilever point 48 where the base portion 42 of the clip member 40 joins the leg 46. The leg 46 extends substantially to the central axis 44 of the tubular body 32. The leg 46 includes an end portion 50 with the end portion 50 being preferably within 30 degrees of perpendicular with respect to the central axis 44 of the tubular body 32. Each leg 46 includes a top portion 52 and an intermediate portion 54. The intermediate portion 54 of each leg 46 is preferably at an angle θ of between 20 and 60 degrees with respect to the central axis 44 of the bore 38, and, more preferably, at an angle θ of 40 degrees with respect to the central axis 44 of the bore 38.

Figure 6:
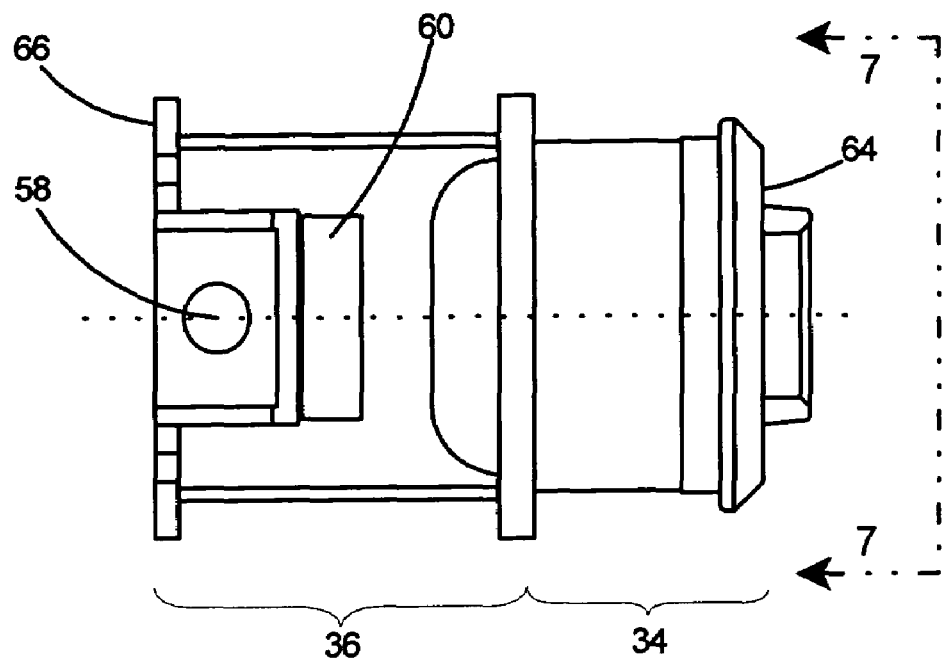
FIG. 6 is a top view of the electrical fitting of FIG. 1.

As shown in FIGS. 11–14, the clip member 40 has two legs 46, including a first leg 46A and a second leg 46B. The base portion 42 of the clip member 40 includes an aperture 56 therein. Additionally, as shown in FIG. 6, the trailing portion 36 of the tubular body 32 includes an aperture 58 therein, which may be a smooth aperture or threaded, and an opening 60 positioned near the aperture 58.

With reference to FIG. 16, the clip member 40 is secured to the tubular body 32 by a fastener 62 secured through the aperture 56 in the clip member 40 into the aperture 58 in the trailing portion 36 of the tubular body 32. The tubular body 32 includes a leading end 64 and a trailing end 66. When the preferred embodiment of the clip member 40 is secured to the tubular body 32, the first leg 46A extends directly into the bore 38 of the tubular body 32 at the trailing end 66. The second leg 46B extends through the opening 60 and into the bore 38 of the tubular body 32. With the clip member 40 secured to the tubular body 32 to form the electrical fitting 30 of the present invention, as shown in FIG. 16, the base portion 42 extends between the first leg 46A and the second leg 46B and the first leg 46A and the second leg 46B extend from the base portion 42 at a substantially constant distance from each other thereby forming parallel legs 46A and 46B. The raised area 39 of the tubular body 32 enables the electrical fitting 30 to accommodate legs 46A and 46B of longer length than comparable prior art fittings, and the greater length increases the flexibility of the legs 46A and 46B thereby allowing them to flex upwards when contacted by a cable inserted therein (not shown) and admit passage of the cable while imparting very little resistance to its forward advance into the bore 38.

Figure 4:
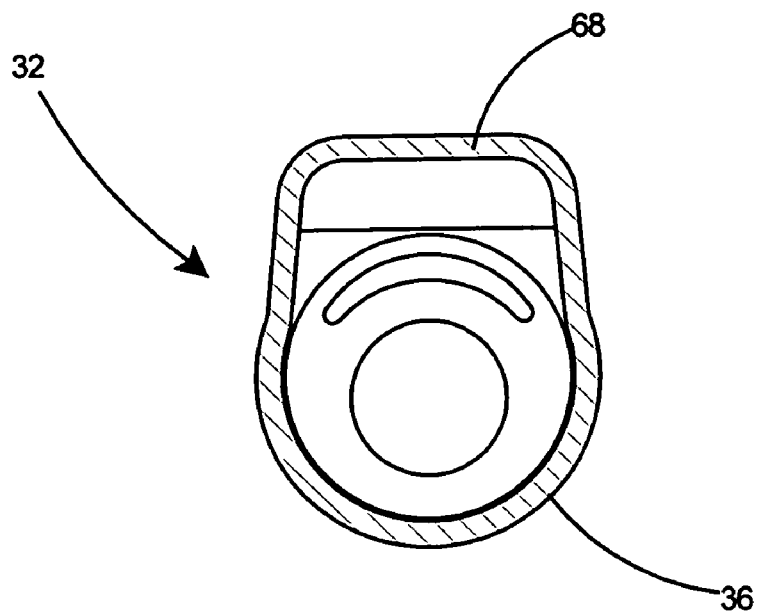
FIG. 4 is a sectional view of the electrical fitting taken along line 4—4 of FIG. 2.
Figure 5:
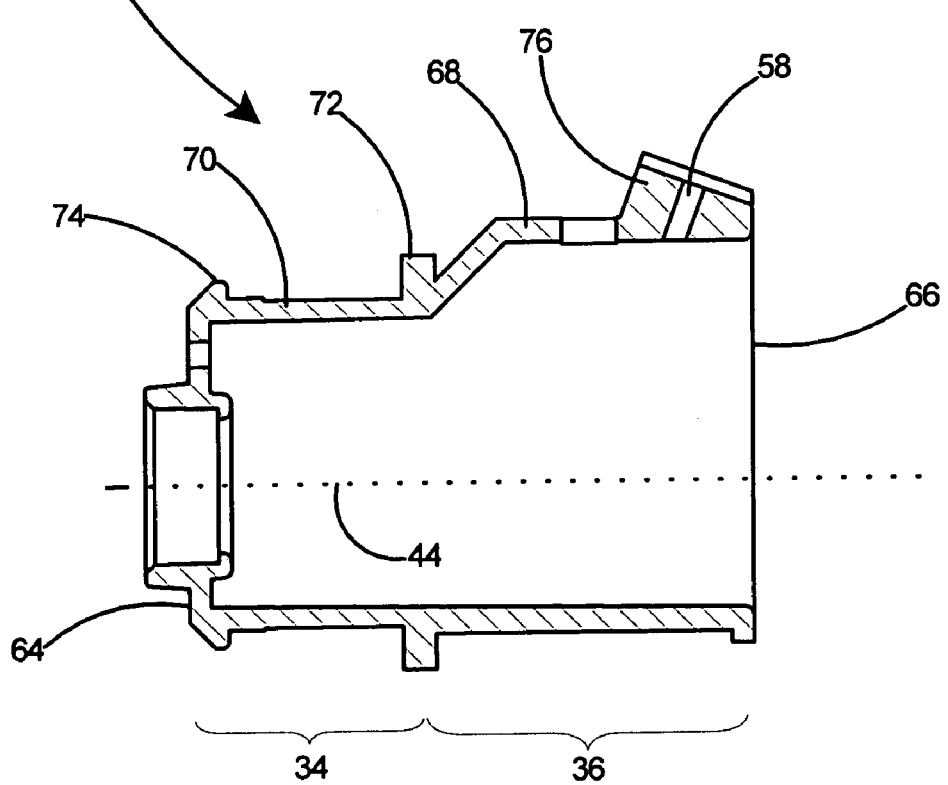
FIG. 5 is a side view of the electrical fitting taken along line 5—5 of FIG. 3.

Referring to FIGS. 4 and 5, the tubular body 32 includes a top wall 68 on the trailing portion 36 and a top wall 70 on the leading portion 34 with the top wall 68 of the trailing portion 36 extending farther from the central axis 44 than the top wall 70 of the leading portion 34. As shown in FIG. 4, the top wall 68 of the trailing portion 36 is substantially flat. The tubular body 32 further includes a central flange 72 between the trailing portion 36 and the leading portion 34 and an end flange 74 on the leading end 64 of the tubular body 32. As shown in FIG. 5, the aperture 58 in the trailing portion 36 of the tubular body 32 is formed in a thick wall section 76.

Figure 7:
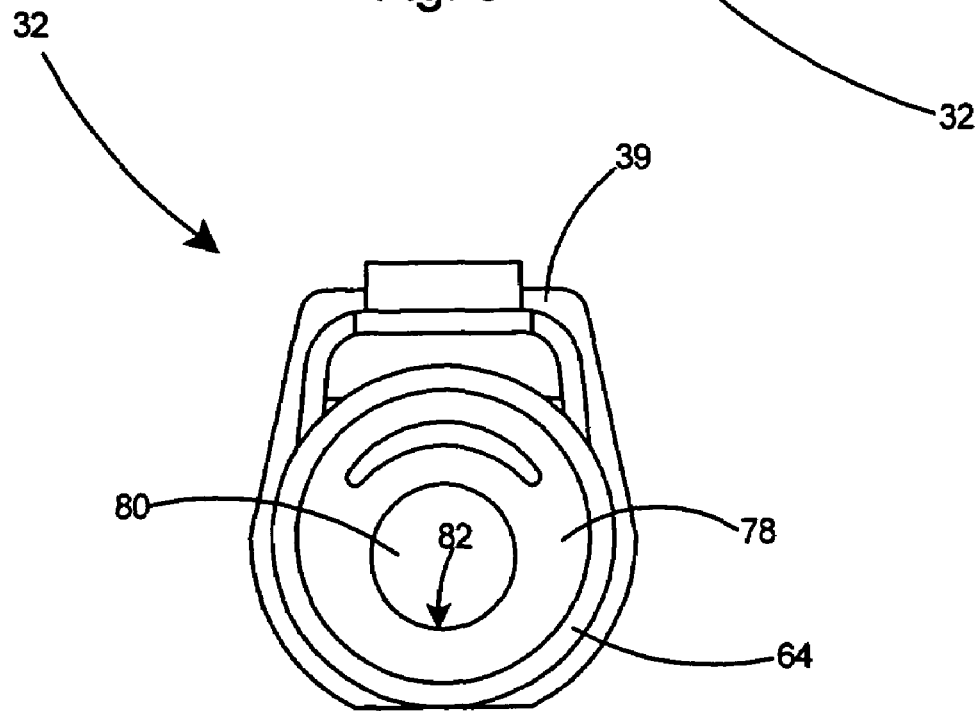
FIG. 7 is a front view of the electrical fitting taken from line 7—7 of FIG. 6.

With reference to FIG. 7, the tubular body 32 further includes a partial closure 78 on the leading end 64. The partial closure 78 includes an opening 80 therein. Edges 82 on the partial closure 78 surround the opening 80.

Figure 2:
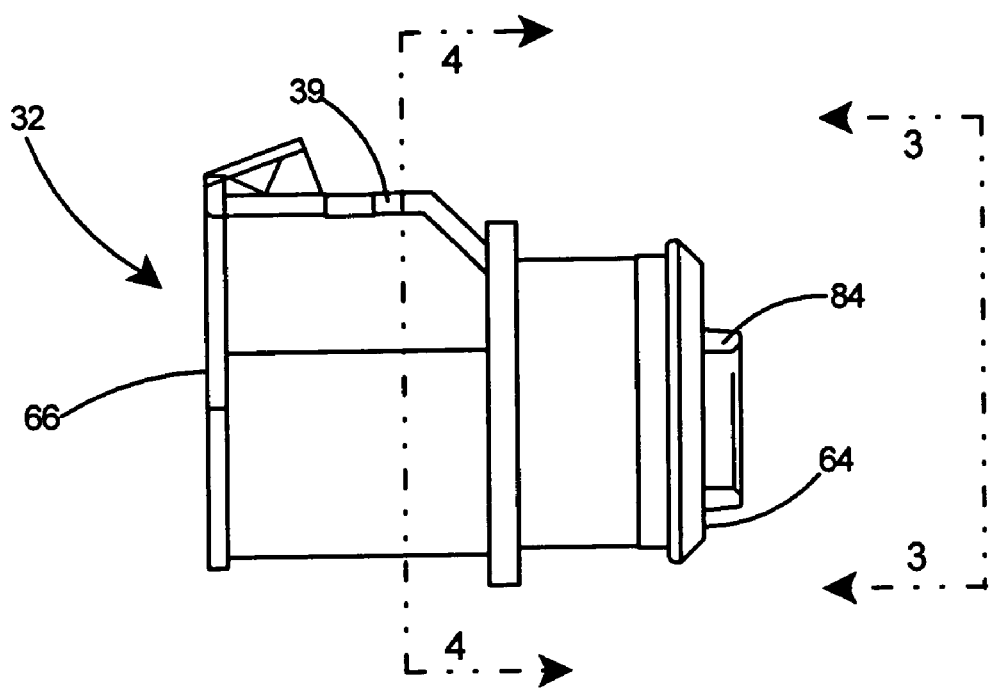
FIG. 2 is a side view of the electrical fitting of FIG. 1.
Figure 3:
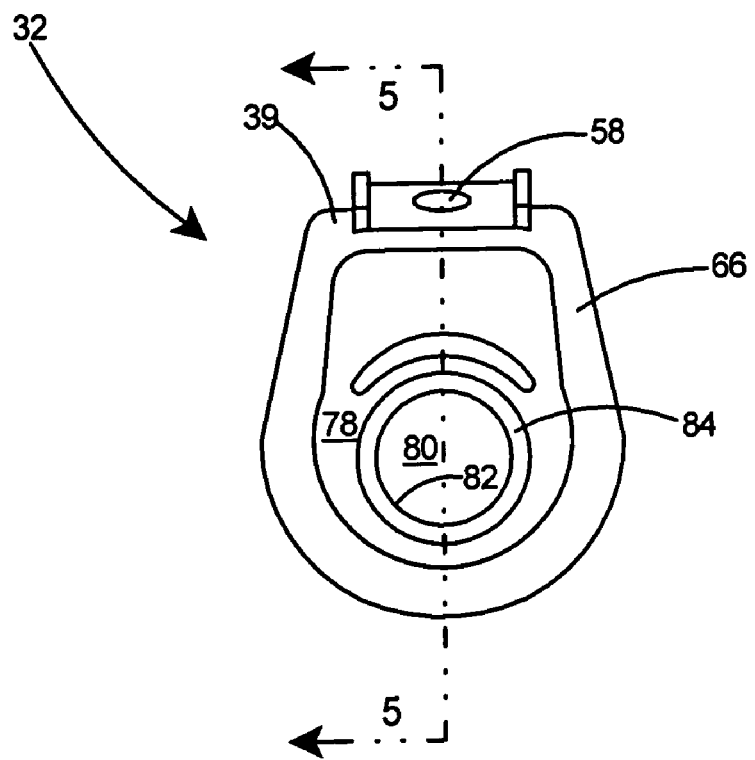
FIG. 3 is a front view of the electrical fitting as taken from line 3—3 of FIG. 2.
Figures 8, 9:
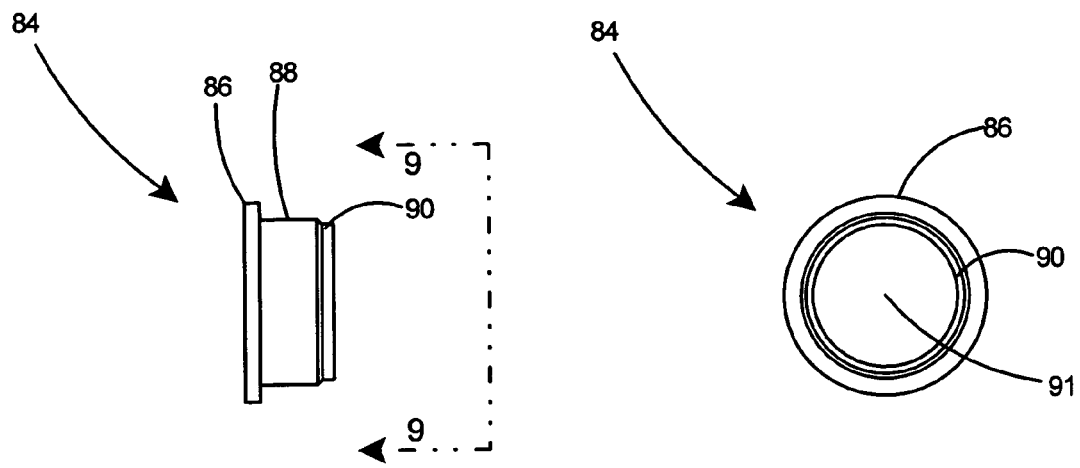
FIG. 8 is a side view of an insert that is used in conjunction with the electrical fitting of FIG. 1.
FIG. 9 is an end view of the insert taken from line 9—9 of FIG. 8.

A tubular insert 84 which may be used with the electrical fitting of the present invention is depicted in FIGS. 8 and 9. The insert 84 includes an end flange 86, a smooth seat 88, a necked-down nose section 90, and a center bore 91. As shown in FIGS. 2 and 3, the insert 84 may be pressed into the opening 80 of the partial closure 78 on the leading end 64 of the tubular body 32 to substantially cover the edges 82 of the opening 80. The insert 84 acts to protect the outer sheaths of any wiring (not shown) that is later advanced through the opening 80 within the partial closure 78 of the tubular body 32. The insert 84 is preferably molded of plastic.

Figure 19:
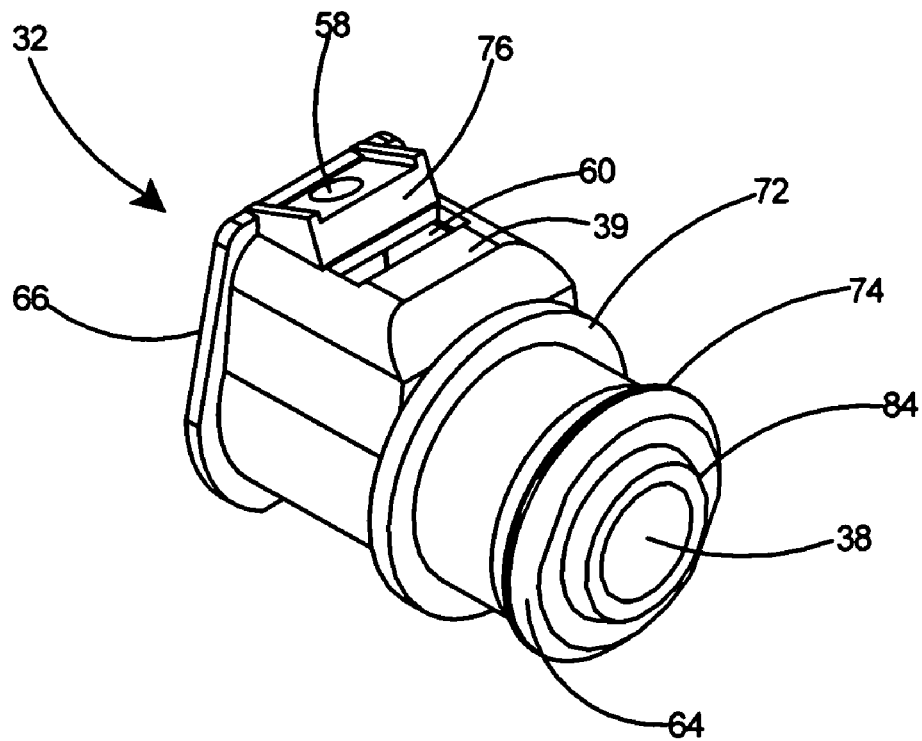
FIG. 19 is a perspective view from the leading end of a tubular body that forms a portion of electrical fitting of FIG. 1.
Figure 20:
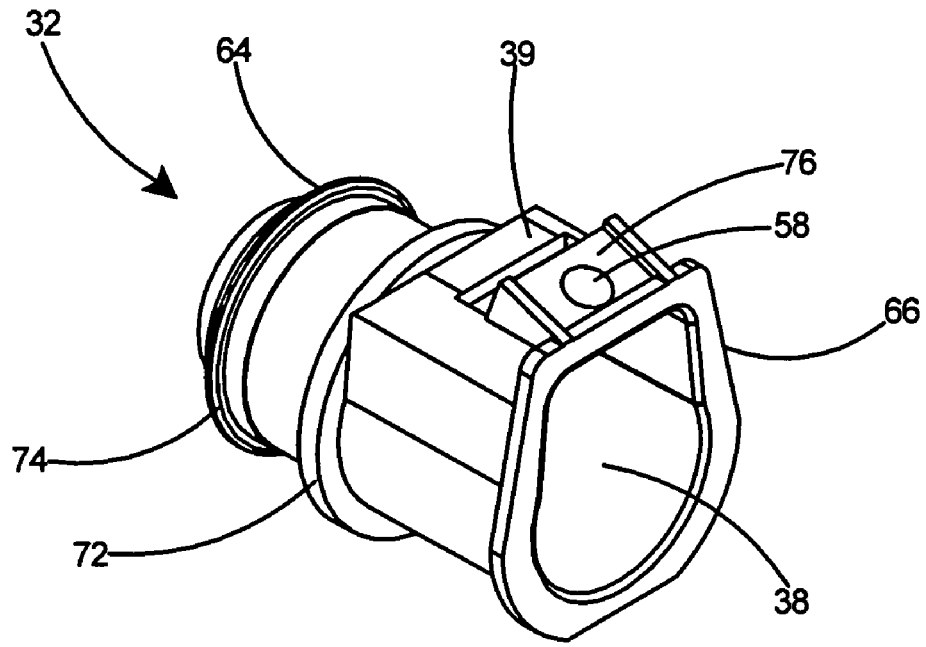
FIG. 20 is a perspective view from the trailing end of the tubular body of FIG. 19.

As shown in FIGS. 19 and 20, the thick wall section 76 including the aperture 58 therein is located at the trailing end 66 of the tubular body 32. As depicted in FIG. 19, the plastic insert 84 is secured in the leading end 64 of the tubular body 32.

The tubular body 32 is constructed of a conductive metal such as steel, zinc, galvanized steel, or aluminum. The tubular body 32 of the present invention is typically formed by die-casting and die-casting alloys are the most preferred material of construction. A most preferred material of construction for the tubular body is Zamak™, a casting alloy comprised mainly of zinc alloyed with aluminum, magnesium, and copper and available from Eastern Alloys, Maybrook, N.Y. By constructing the tubular body of Zamak™ or other appropriate metals, the tubular body will be electrically conductive and provide good continuity throughout the fitting.

Figure 12:
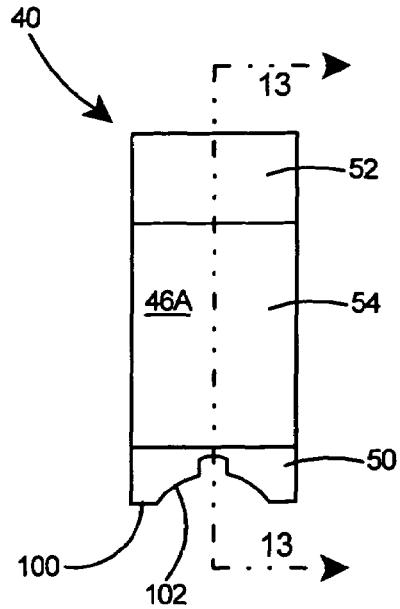
FIG. 12 is an end view of the clip member taken from line 12—12 of FIG. 11.
Figure 13:
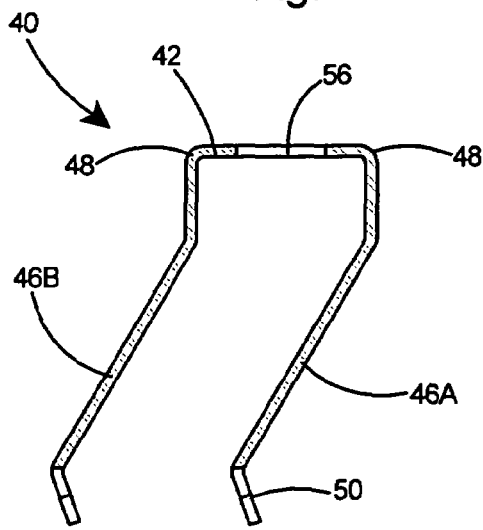
FIG. 13 is a sectional view of the clip member taken along line 13—13 of FIG. 12.
Figure 14:
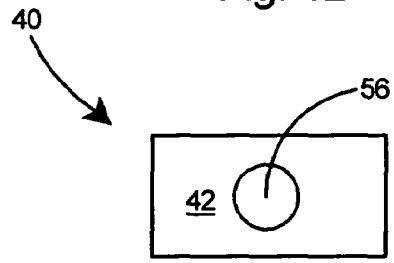
FIG. 14 is a top view of the clip member of FIG. 11.

Referring to FIG. 12, the lower end 100 of each leg 46 of the clip member 40 includes a semicircular notch 102. The semicircular notch 102 is centered on the lower end 100 of the leg 46 and approximates the outer curvature of the portion of a cable (not shown) that the lower end 100 of the leg 46 will seat within. As described above, the leg 46 seats in a groove of the cable (see FIG. 16). Since the electrical fitting of the present invention accommodates two trade sizes of cable, the semicircular notch 102 on the leg 46 includes an arc that provides optimal surface contact to each trade size of cable.

Figure 10:
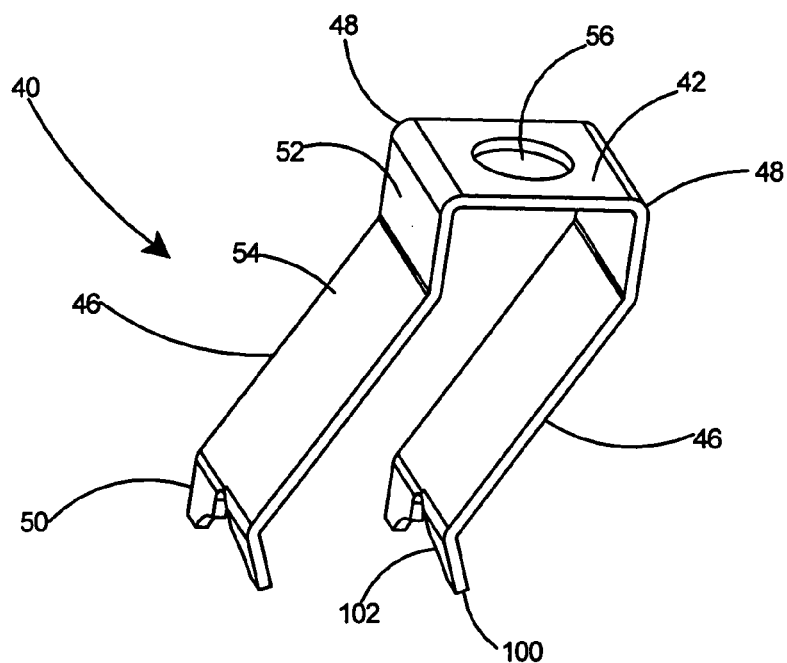
FIG. 10 is a perspective view of a clip member that forms a portion of the electrical fitting of FIG. 1.
Figure 11:
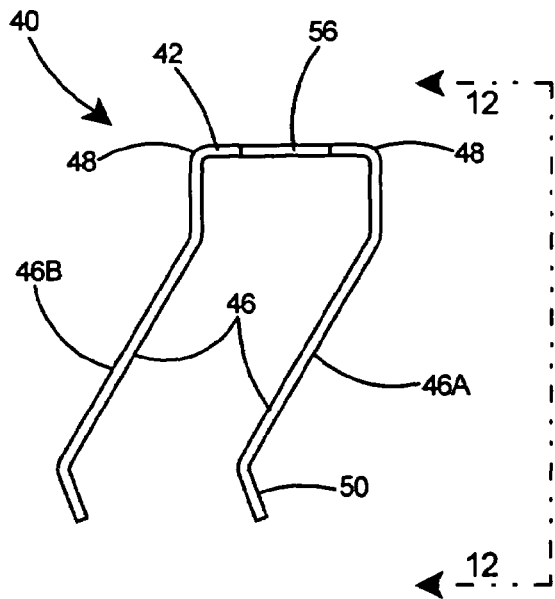
FIG. 11 is a side view of the clip member of FIG. 10.
Figure 15:
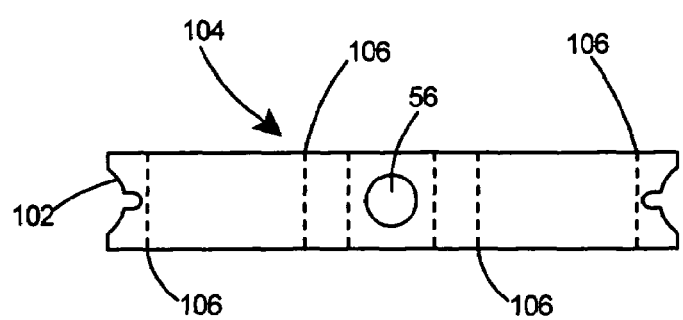
FIG. 15 is a plan view of a blank that is used to form the clip member of FIG. 10.

With reference to FIG. 15, the clip member is preferably formed from a blank 104 of metal. Bend lines 106 are shown on the blank 104 to depict the areas in which the blank 104 will be bent to form the preferred embodiment of the clip member having the shape shown in FIG. 10.

The clip member 40 is preferably constructed of spring steel and is electrically conductive. Constructing the tubular body 32 of zinc alloy and the clip member 40 of spring steel enables the electrical fitting 30 to establish electrical continuity between the metallic-sheathed cable.

Figure 17:
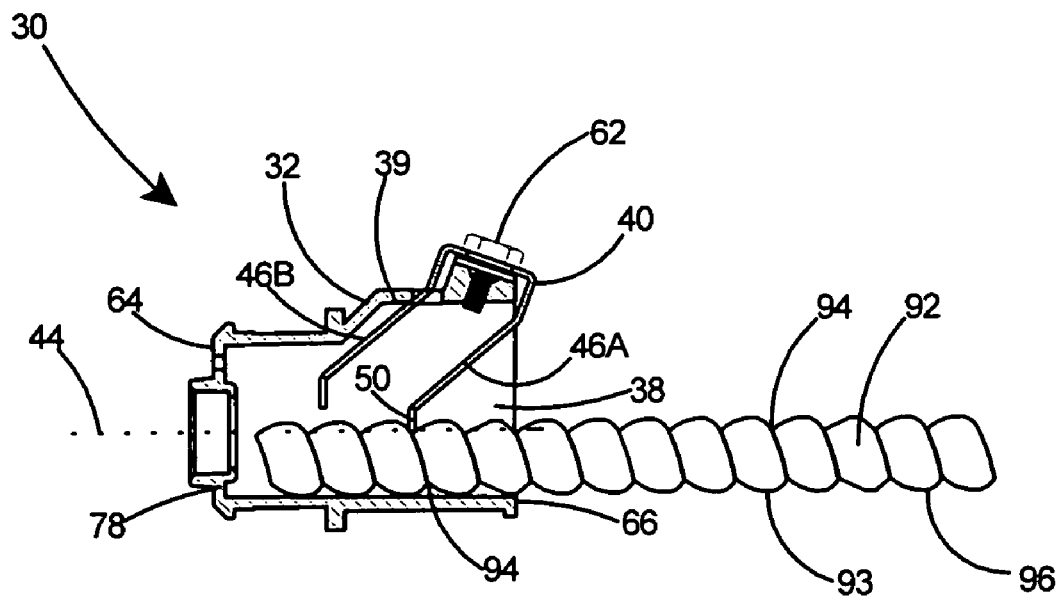
FIG. 17 is a sectional view of the electrical fitting with a metal clad electrical cable secured therein into the fitting.
Figure 18:
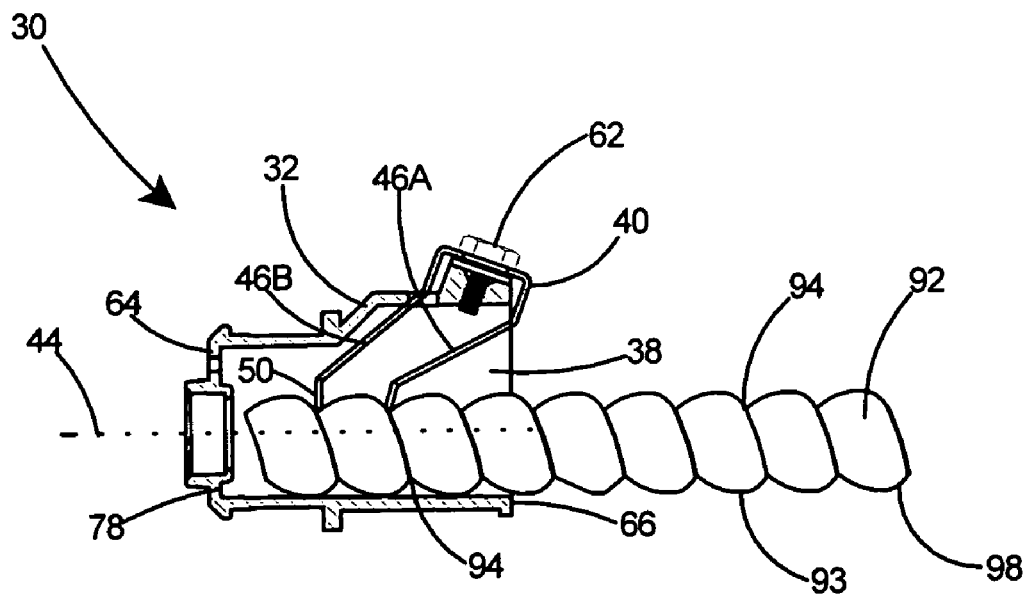
FIG. 18 is a sectional view of the electrical fitting similar to FIG. 17 but with a larger trade size electrical cable secured therein into the fitting.

For operation of the present invention, the reader is directed to the two examples given in FIGS. 17 and 18. As previously mentioned in the objects and advantages section, the electrical fitting 30 of the present invention will typically accommodate two trade sizes of cable, which has several advantages in production and stocking requirements. The electrical fitting is especially useful for securing MC (metal clad) or armored cable to a panel or electrical box. MC or armored cables include a convoluted outer surface 92 consisting of peaks 93 and grooves 94 such as shown in FIG. 17. As the electrical fitting is capable of accepting two trade sizes of cable, the parallel legs 46 are capable of engaging one or more of the grooves 94 of the electrical cable depending on the trade size.

With reference to FIG. 17, a first cable 96 is inserted within the bore 38 of the tubular body 32 and, as a result of the flexibility imparted to the legs 46A and 46B by the length and angle of the legs, is engaged by at least one of the legs 46A of the electrical fitting 30 in one of the grooves 94 of the first cable 96. The legs 46A and 46B have a certain degree of flexibility, have a certain length, and are at an angle that allows them to flex upwards as a cable is inserted into the fitting 30. As the cable 96 is pushed into the fitting 30, the length and angle of the legs 46A and 46B with respect to the central axis 44 impart enhanced flexibility to the legs 46A and 46B and enables the first leg 46A to flex upwards and admit passage of the cable 96 with very slight resistance. Forward insertion of the cable 96 is limited by the partial closure 78 at the leading end 64 of the fitting 30. Once the cable 96 is fully inserted into the fitting 30, as shown in FIG. 17, the cable 96 is securely held by the first leg 46A. As a result of the first leg 46A seating in a groove 94, and the angle of the first leg 46A with respect to the central axis 44, the cable 96 is held very securely and cannot be removed by a backward force placed upon the cable 96. However, the cable 96 can easily be removed by rotating the cable 96 in a counterclockwise direction with respect to the fitting 30 thereby allowing the first leg 46A to ride in the groove until the cable 96 is fully removed from the fitting 30. The electrical fitting 30 of the present invention effectively grasps a cable 96 by the use of a single leg 46A and 46B from one side of the fitting 30, versus prior art connectors (not shown) that employ multiple gripping members from multiple sides of the fitting.

With reference to FIG. 18, an electrical fitting 30 of the same size as that shown in FIG. 17 is capable of accommodating a second cable 98 of a larger trade size. The larger trade size or smaller gauge cable 98 is of a larger diameter than that shown in the previous example. The second cable 98 is inserted within the bore 38 of the tubular body 32 and, as a result of the flexibility imparted to the legs by the length and angle of the legs, is engaged by both legs 46A and 46B of the electrical fitting 30. As the distance between the parallel legs 46A and 46B substantially matches the distance between successive grooves 94 of the electrical cable 98, the two legs 46A and 46B seat in successive grooves 94 of the cable 98. The flexibility of the legs 46A and 46B and the spacing between them enables each leg to find a groove 94 on the cable 98. As the cable 98 is pushed into the fitting 30, the length and angle of the legs 46A and 46B with respect to the central axis 44 impart enhanced flexibility to the legs 46A and 46B and enables both legs 46A and 46B to flex upwards and admit passage of the cable 98 with very slight resistance. Forward insertion of the cable 98 is again limited by the partial closure 78 at the leading end of the fitting 30. Once the cable 98 is fully inserted into the fitting 30, as shown in FIG. 18, the cable 98 is securely held by both legs 46A and 46B. As a result of the legs 46A and 46B seating in the grooves 94, and the angle of the legs 46A and 46B with respect to the central axis 44, the cable 98 is held very securely and cannot be removed by a backward force applied thereto. However, similar to the previous example, the cable 98 can easily be removed by rotating the cable 98 in a counterclockwise direction with respect to the trailing end 66 of the fitting 30 thereby allowing the legs 46A and 46B to ride or track in the grooves 94 as the cable 98 is rotated until the cable 98 is fully removed from the fitting 30. As compared to prior art fittings, the clip member 40 of the present invention is thicker and more stable, and the legs 46A and 46B are longer so that the electrical fitting 30 of the present invention will accommodate two sizes of cable. The length of the legs 46A and 46B ensures that they are cantilevered over a longer distance than the analogous gripping members of prior art connectors.

The leading end of the electrical fitting can be secured to a panel (not shown) by an attachment arrangement such as the spring steel adapter (14) disclosed in U.S. Pat. No. 6,335,488 or the spring steel adapter (20) disclosed in U.S. Pat. No. 5,266,050, commonly referred to as snap fittings, both of which patents their entireties are incorporated herein by reference.

Alternatively, the attachment arrangement may include threads on the leading portion of the tubular body and a nut (not shown) for engaging the threads such as the standard lock nut (70) disclosed in U.S. Pat. No. 6,335,488, the entirety of which is incorporated herein by reference.

Figure 21:
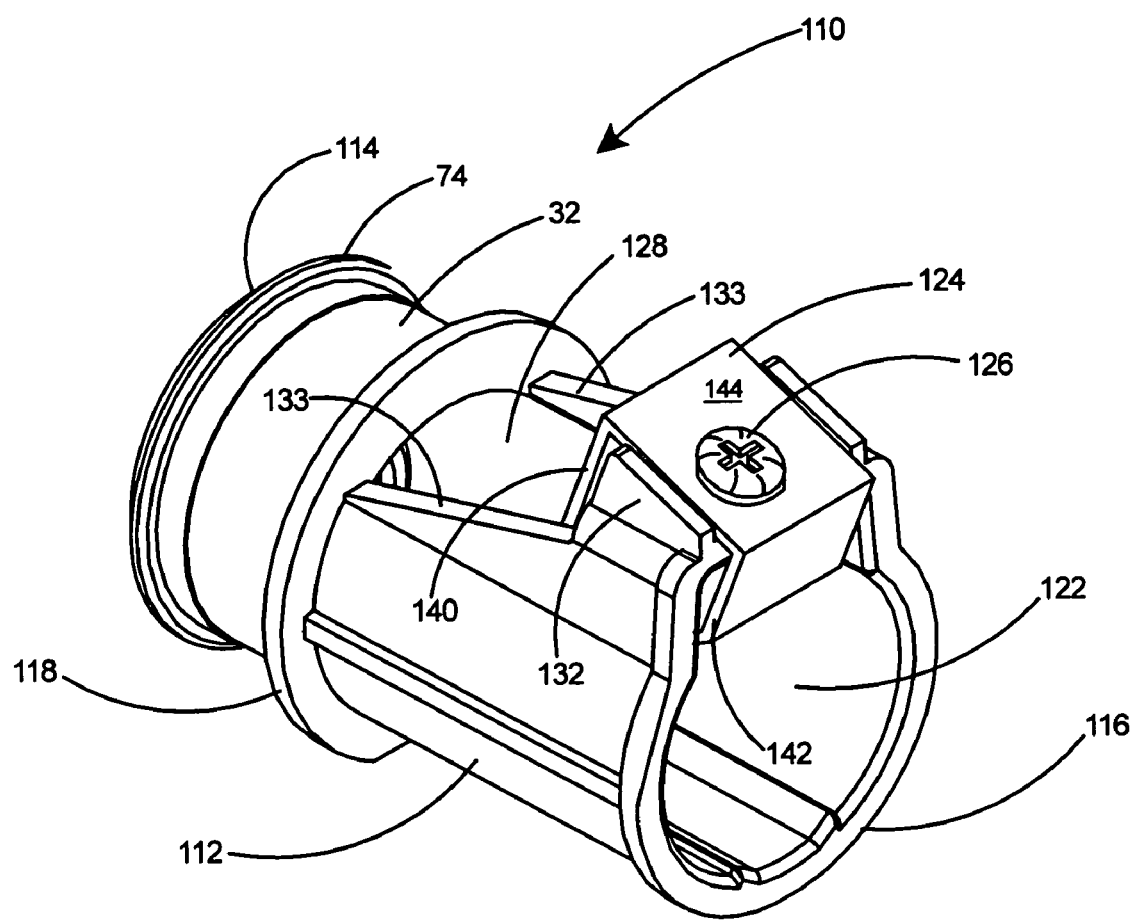
FIG. 21 is a perspective view from the trailing end of the preferred embodiment of an electrical fitting according to the present invention.
Figure 22:
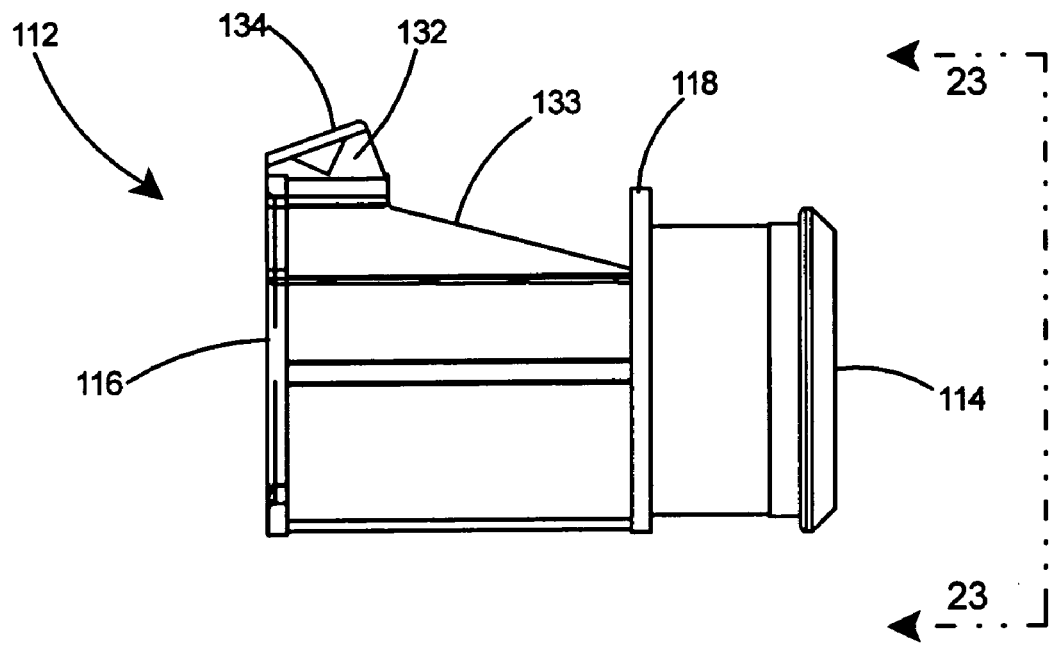
FIG. 22 is a side view of the connector body portion of the electrical fitting of FIG. 21.
Figure 23:
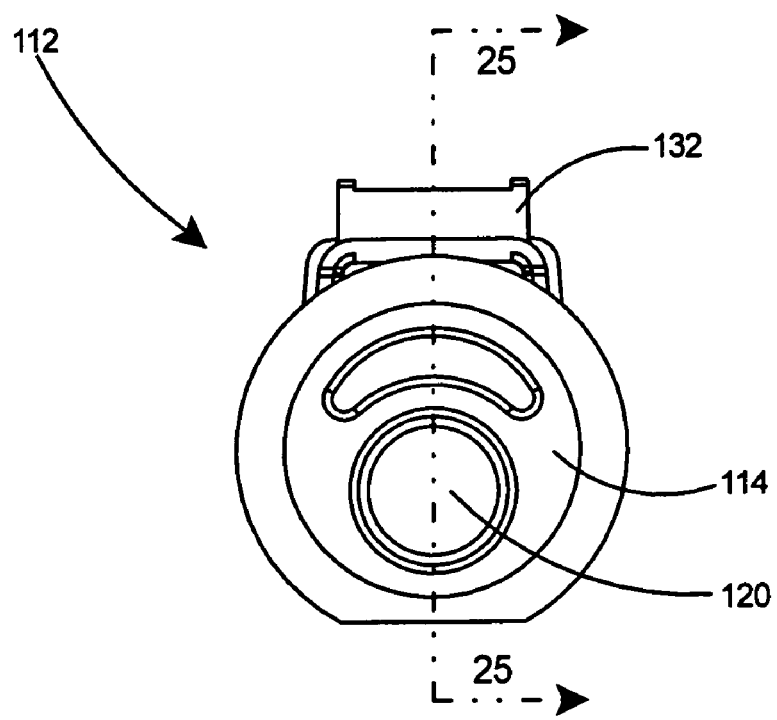
FIG. 23 is a front view of the connector body as taken from line 23—23 of FIG. 22.

Referring to FIG. 21, there is shown a preferred embodiment of an electrical fitting 110 for connecting electrical cable to a panel (not shown). The electrical fitting 110 includes a connector body 112 including a leading end 114 and a trailing end 116 separated by an intermediate flange 118. The connector body 112 includes a leading opening 120 (see FIG. 23) at the leading end 114 and a trailing opening 122 at the trailing end 116. The intermediate flange 118 extends transversely beyond the connector body 112 by an amount sufficient to prevent the fitting from going into an electrical box outlet hole (not shown) when the leading end 114 of the connector body 112 is inserted therein. The electrical fitting 110 includes a tandem tang 124 is secured thereto by a fastener 126.

The leading end 114 of the electrical fitting 110 can be secured to a panel (not shown) by an attachment arrangement such as the aforementioned spring steel adapters disclosed in U.S. Pat. No. 6,335,488 or U.S. Pat. No. 5,266,050.

Figure 24:
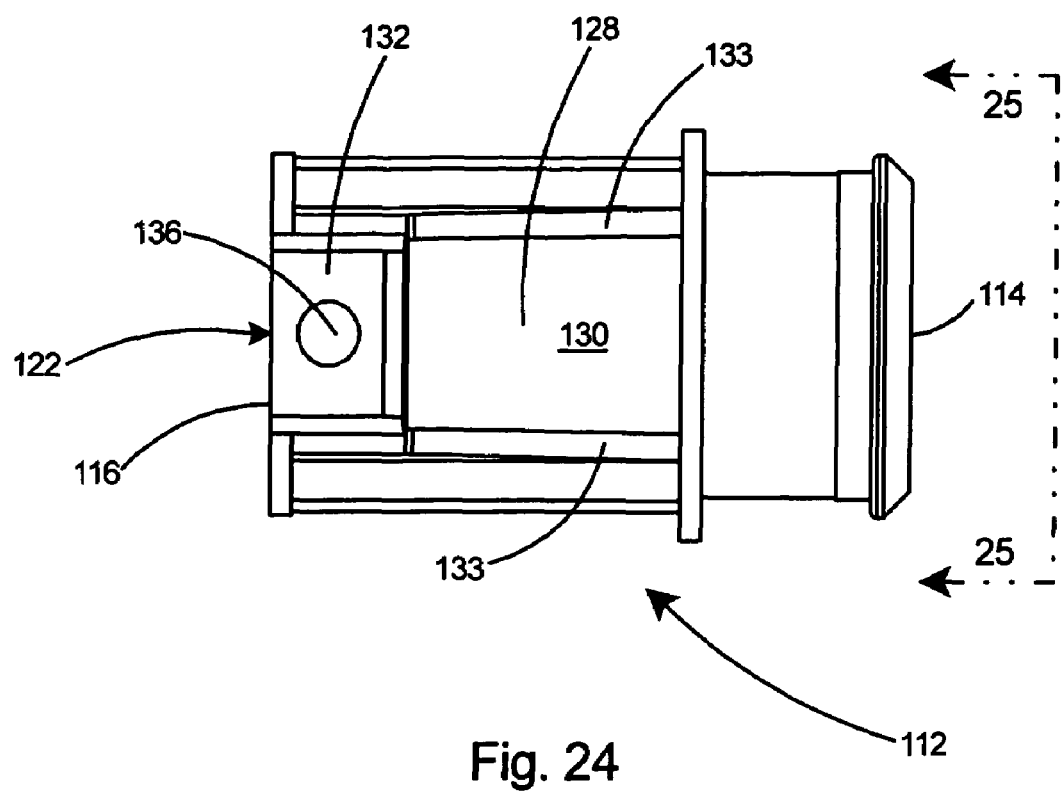
FIG. 24 is a top view of the connector body of FIG. 22.
Figure 25:
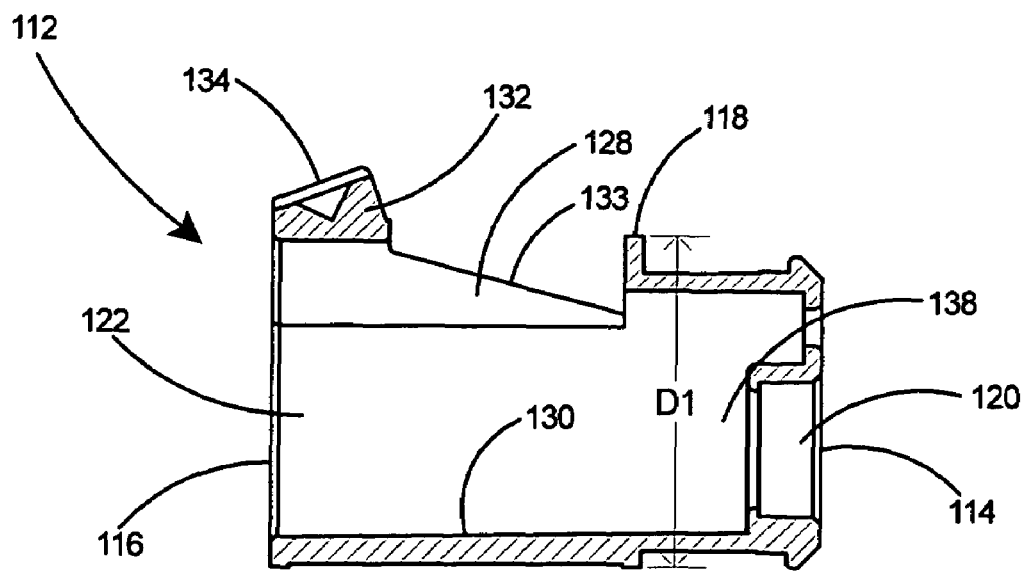
FIG. 25 is a sectional view of the connector body of FIG. 21.

With reference to FIGS. 24 and 25, the trailing end 116 of the connector body 112 includes an open channel 128 that extends from the trailing opening 122 to the flange 118. The open channel 128 includes a bottom 130 therein. The connector body 112 further includes a bridge 132 adjacent the trailing opening 122. Two outwardly extending ramps 133 extend from the part of the open channel 128 adjacent the flange 118 outwardly and rearwardly to provide the support for bridge 132. Adjacent the trailing end opening 122 bridge 132 extends transversely at the top of the outermost part of the ramp 133 to bridge the open channel 128. The bridge 132 bridges the open channel 128 and extends transversely beyond the outer dimension D1 of the intermediate flange 118. The bridge 132 includes an inclined surface 134 and an aperture 136 therein. The connector body 112 also includes a bore 138 extending from the flange 118 to the leading opening 120.

Figure 34:
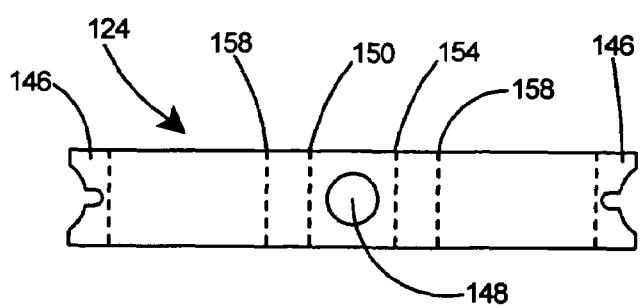
FIG. 34 is a plan view of a blank that is used to form the tandem tang of FIG. 30.

Referring to FIGS. 30–34, the tandem tang 124 includes a leading tang 140, a trailing tang 142, and a common middle section 144. The leading tang 140 and trailing tang 142 each include a cable grabbing end 146. An aperture 148 is provided in the common middle section 144 of the tandem tang 124 for receiving a fastener (see FIG. 21) therein for securing the tandem tang 124 to the connector body 112. The common middle section 144 of the tandem tang 124 is bent at one end at a first right angle 150 to form the leading tang 140 and at the opposite end at a second right angle 154 to the trailing tang 142. The leading tang 140 and the trailing tang 142 each include a bend line 158 as shown in FIG. 34.

Figure 26:
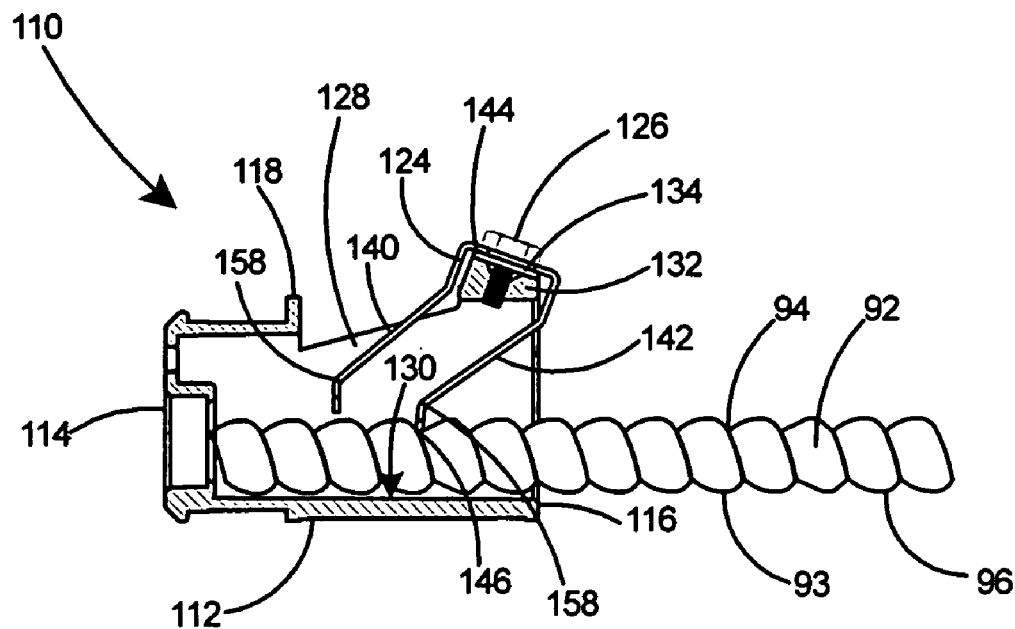
FIG. 26 is a sectional view of the electrical fitting of FIG. 21 with a metal clad electrical cable secured therein into the fitting.
Figure 27:
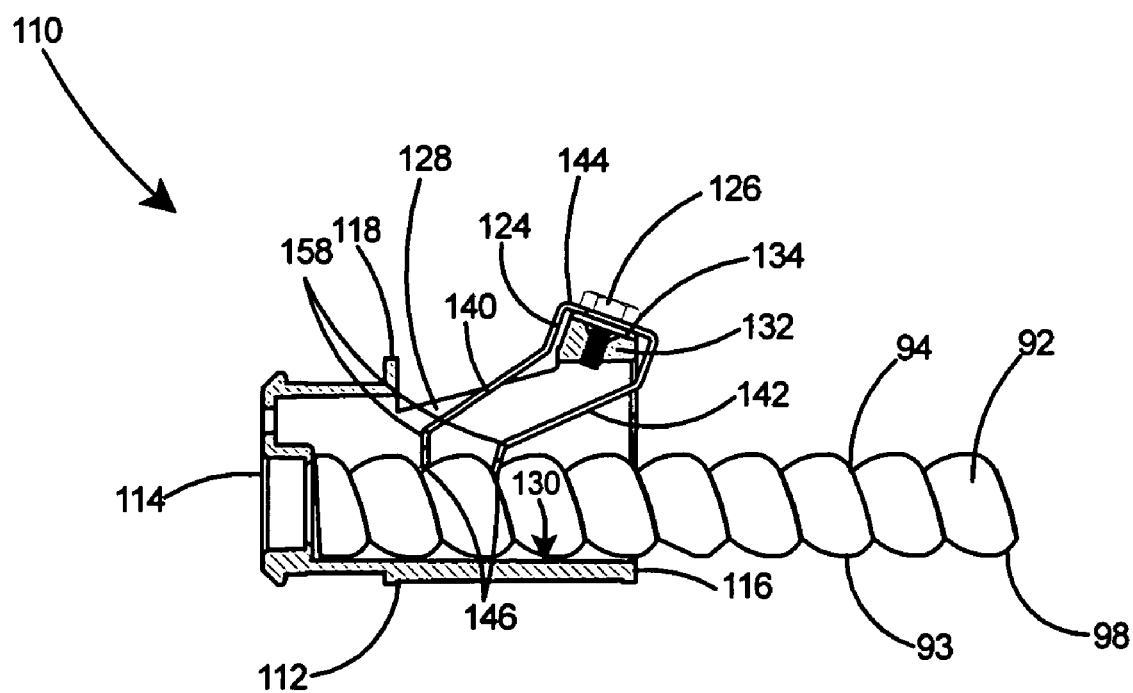
FIG. 27 is a sectional view of the electrical fitting of FIG. 21 but with a larger trade size electrical cable secured therein into the fitting.
Figure 28:
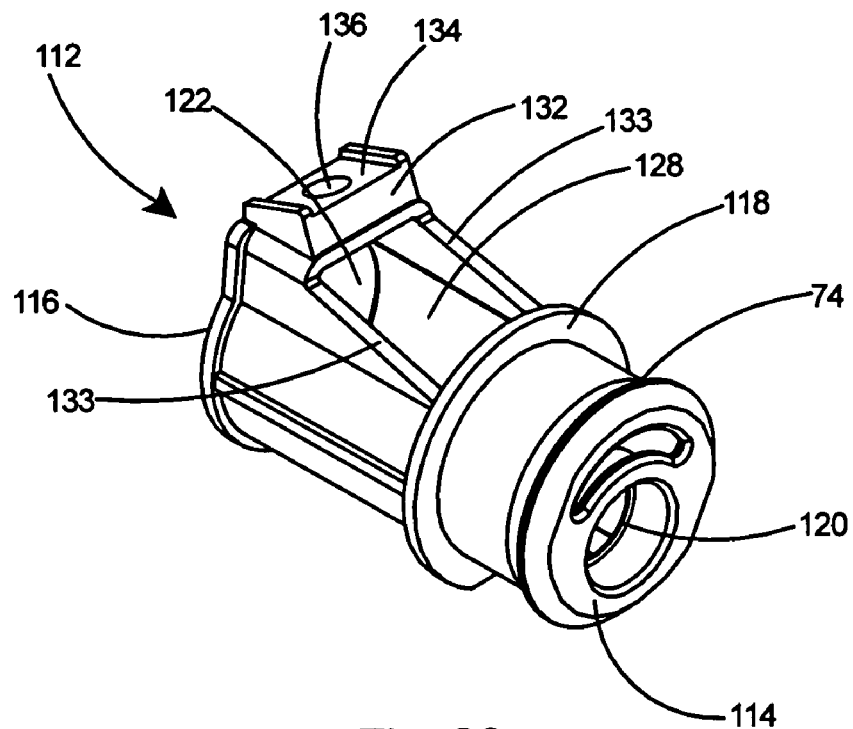
FIG. 28 is a perspective view from the leading end of a preferred embodiment of a connector body that forms a portion of electrical fitting of FIG. 21.
Figure 29:
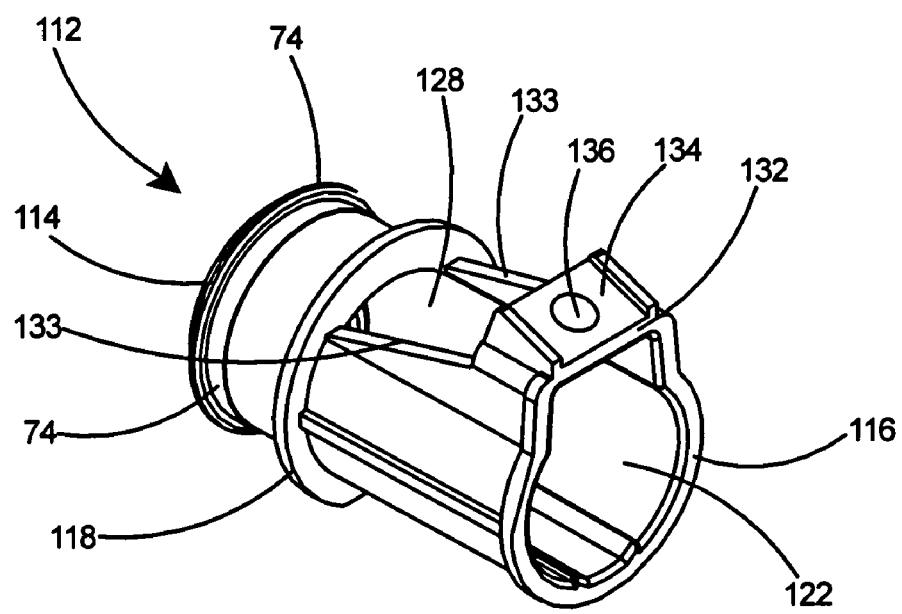
FIG. 29 is a perspective view from the trailing end of the connector body of FIG. 28.
Figure 30:
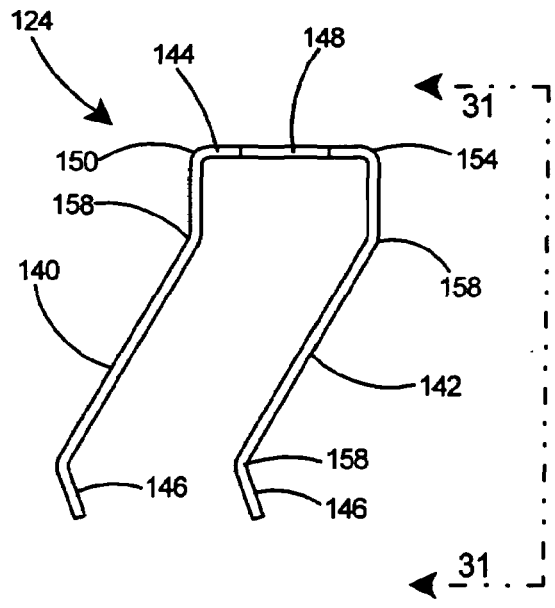
FIG. 30 is a side view of a tandem tang that forms a portion of the electrical fitting of FIG. 21.
Figure 31:
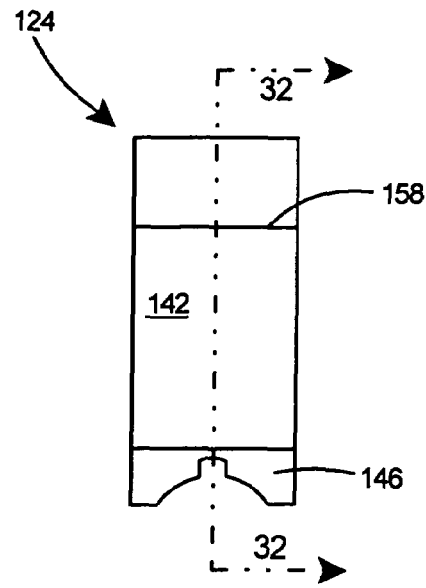
FIG. 31 is an end view of the tandem tang taken from line 31—31 of FIG. 30.
Figure 32:
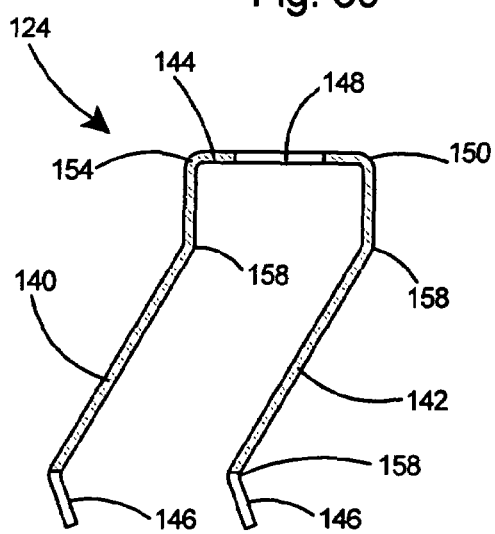
FIG. 32 is a sectional view of the tandem tang taken along line 32—32 of FIG. 31.
Figure 33:
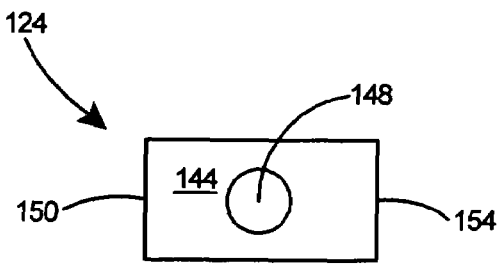
FIG. 33 is a top view of the tandem tang of FIG. 30.

With reference to FIGS. 26–27, the bend lines 158 on both the leading tang 140 and the trailing tang 142 direct the cable grabbing end 146 towards the cable 92 thereby holding the cable against the bottom 130 of the open channel 128. The inclined surface 134 of the bridge 132 is included on the connector body 112 for receiving and attaching the common middle section 144 of the tandem tang 124. The leading tang 140 and trailing tang 142 each include a cable grabbing end 146 for contacting and holding a cable 96 against the bottom 130 of the open channel 128.

Figure 35:
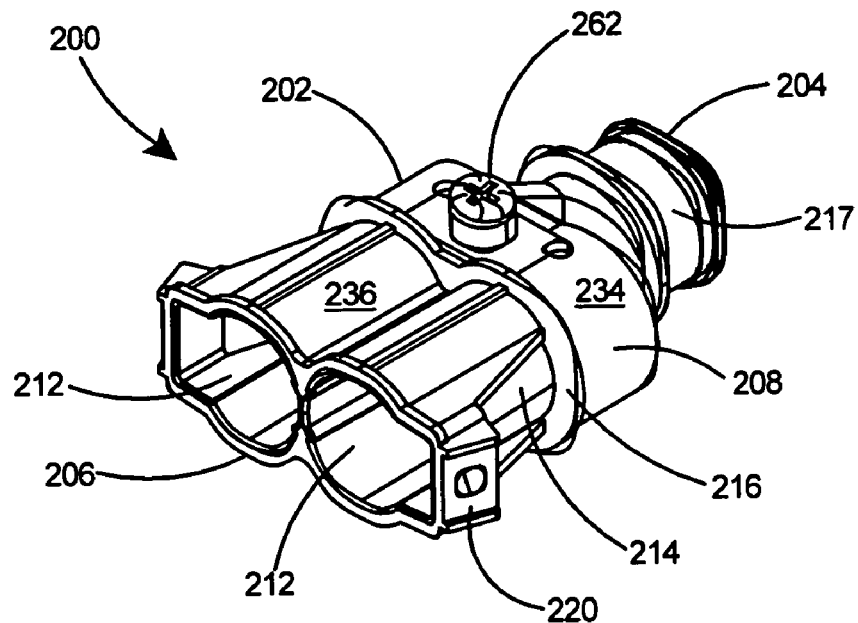
FIG. 35 is a perspective view from the trailing end of the preferred embodiment of a connector body portion of an electrical fitting according to the present invention.
Figure 36:
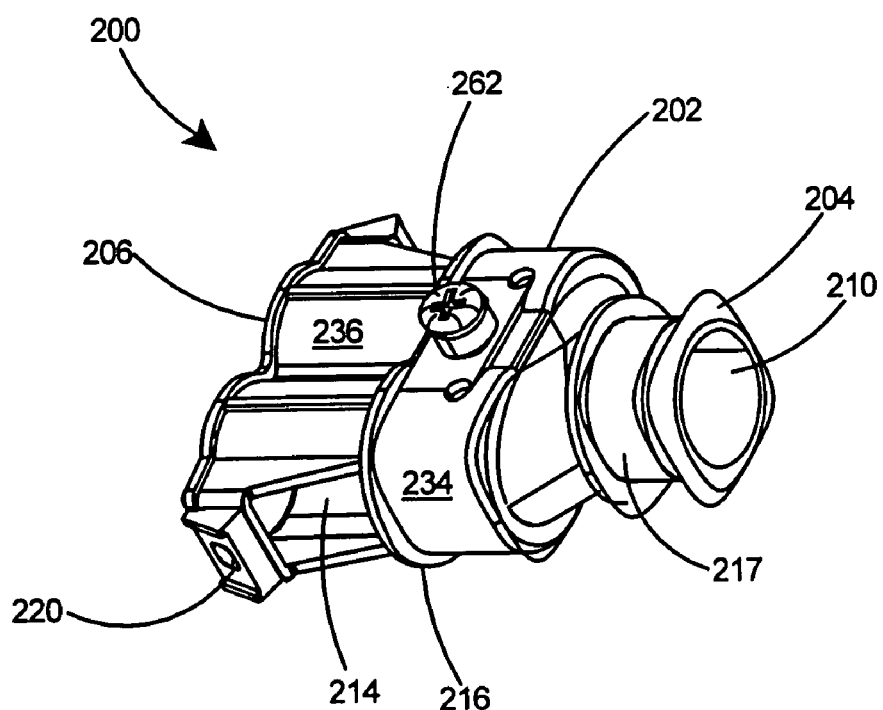
FIG. 36 is a perspective view from the leading end of the connector body of FIG. 35.

Referring to FIGS. 35 and 36, there is shown a preferred embodiment of a duplex electrical fitting 200 for connecting two electrical cables to a panel (not shown). The duplex electrical fitting 200 includes a connector body 202 including a leading end 204, a trailing end 206, and a sidewall 208. The connector body 202 includes a leading opening 210 in the leading end 204 and two trailing openings 212 in the trailing end 206. The connector body 202 further includes a midportion 216 intermediate the leading end 204 and the trailing end 206. The connector body 202 includes two open channels 214 with each open channel 214 extending through the sidewall 208 into one of the trailing openings 212 at the trailing end 206 of the connector body 202. The connector body 202 includes a midportion 216 approximately midway between the leading end 204 and trailing end 206. The leading end 204 of the connector body 202 of the duplex electrical connector 200 includes a cylindrical nose portion 217.

Figure 42:
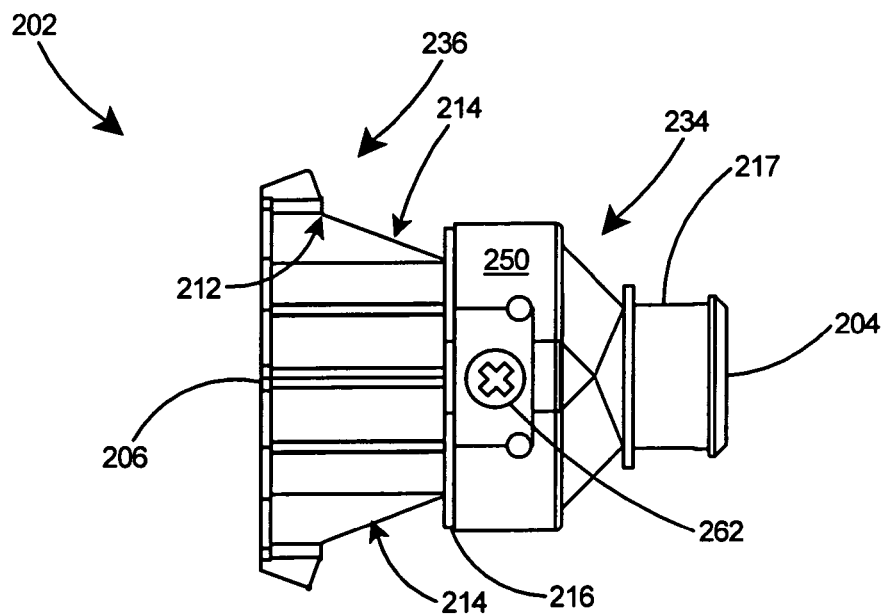
FIG. 42 is a top view of the connector body formed by the joining of the leading and trailing body portions of FIG. 41.
Figure 46:
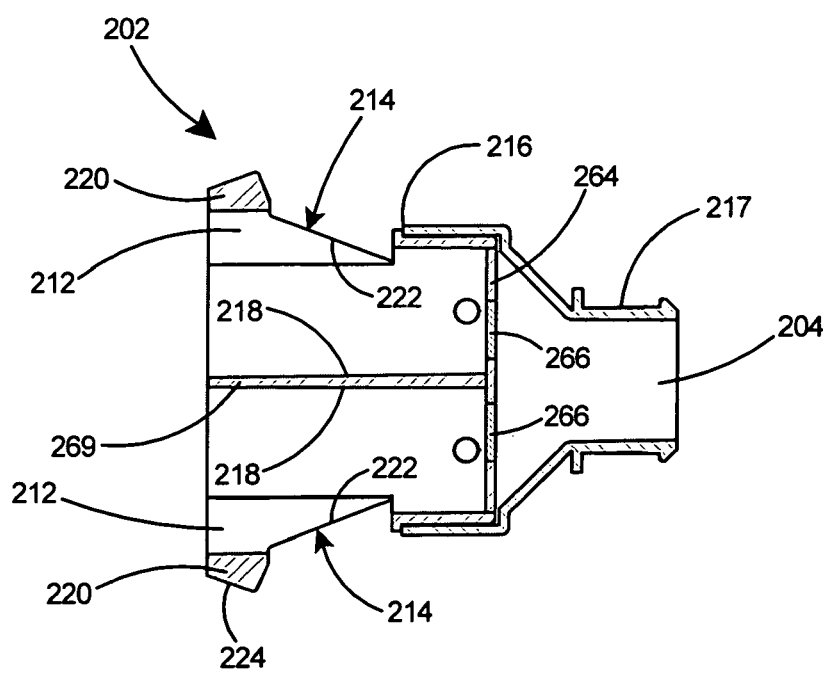
FIG. 46 is a sectional view of the connector body formed by the joining of the leading and trailing body portions of FIG. 43.

As shown in FIG. 42, the open channels 214 extend from the trailing opening 212 to the midportion 216 of the connector body 202. With reference to FIG. 46, the open channels 214 include a bottom 218 therein within the connector body 202. A bridge 220 adjacent each of the trailing openings 212 bridges the open channels 214. Two ramps 222 extend outwardly and rearwardly from the midportion 216 of the connector body 202 to provide support for the bridge 220. The bridge 220 includes an inclined surface 224.

Figure 48:
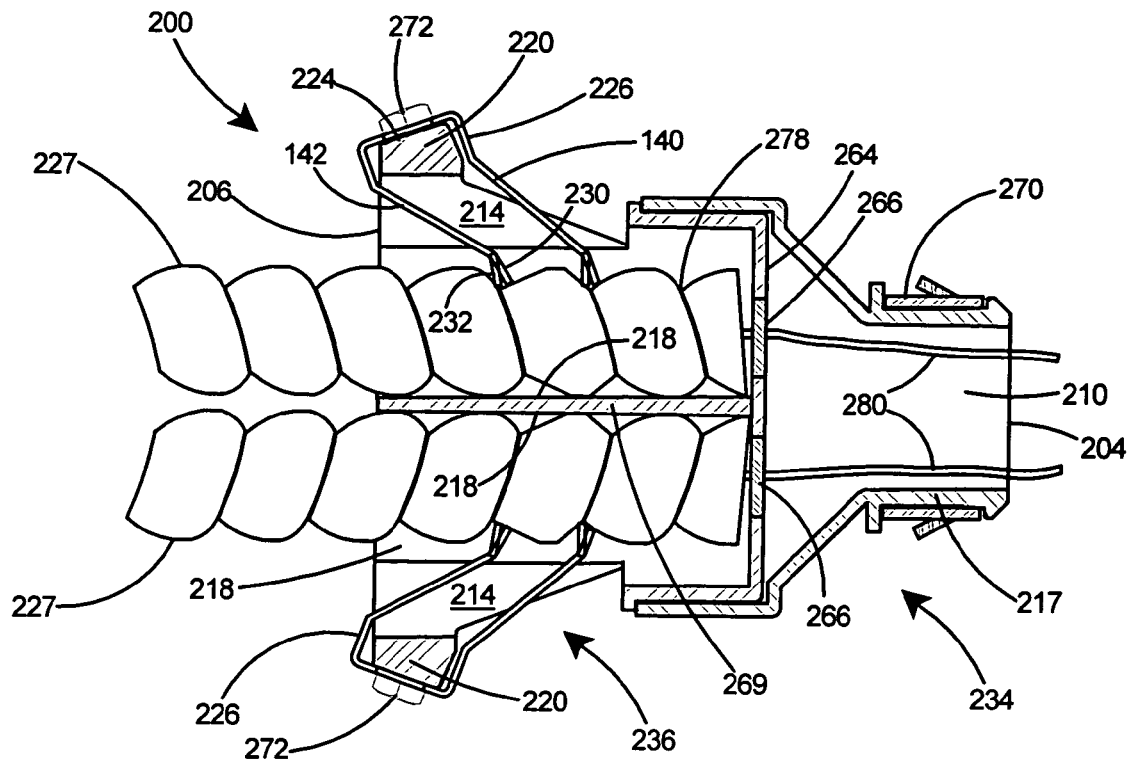
FIG. 48 is a sectional view of the electrical fitting of the present invention including two cables inserted therein.

As shown in FIG. 48, the duplex electrical fitting 200 of the present invention includes two tandem tangs 226 for securing electrical cables 227 to the trailing end 206 of the fitting.

Figure 50:
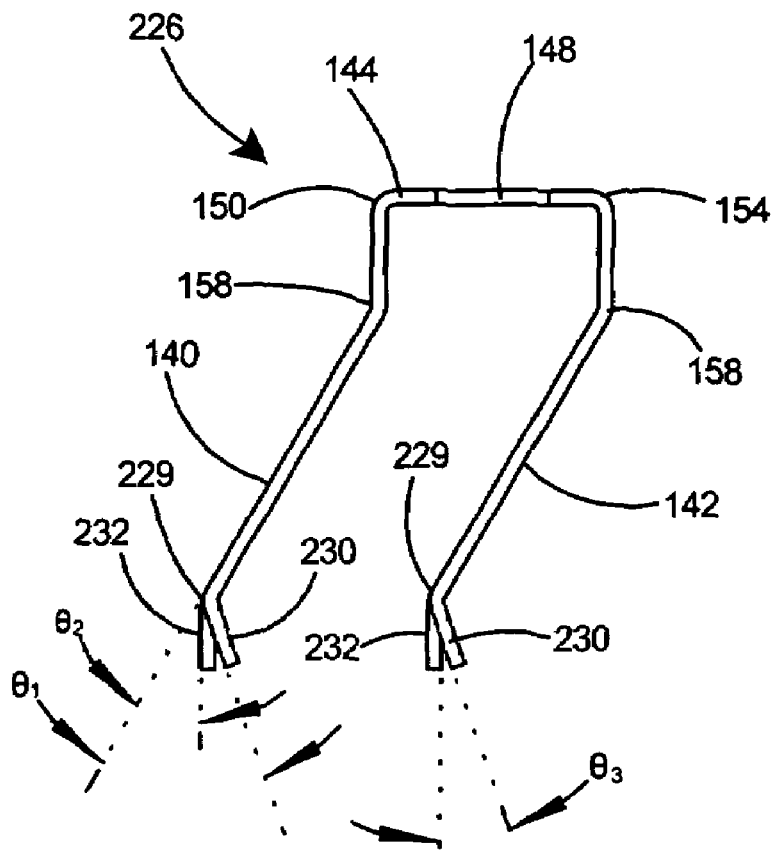
FIG. 50 is a side view of a preferred embodiment of a tandem tang that forms a portion of the duplex electrical fitting of FIG. 49.
Figure 51:
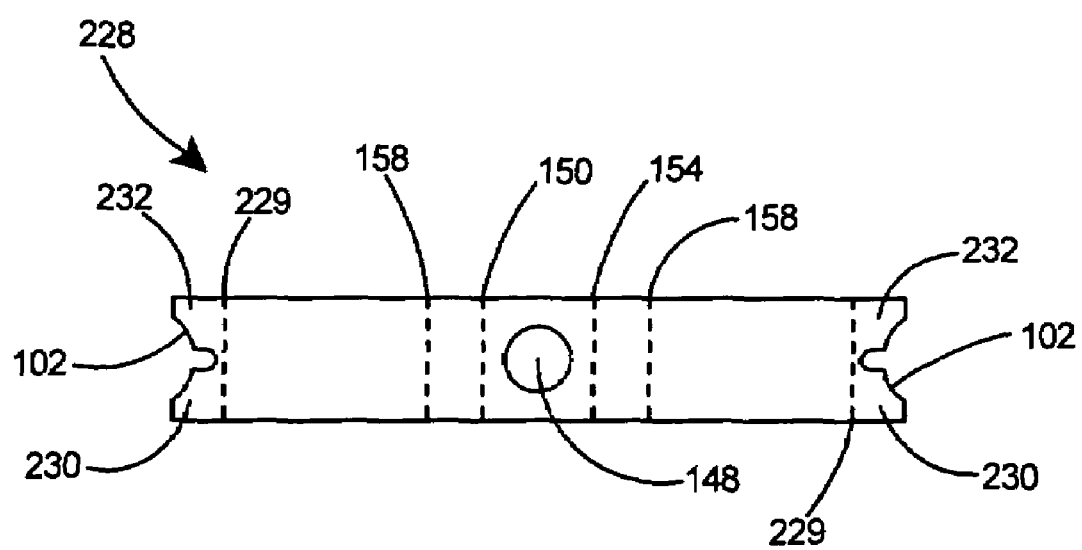
FIG. 51 is a plan view of a blank that is used to form the tandem tang of FIG. 50.

With reference to FIGS. 50 and 51, the tandem tang 226 is analogous to the tandem tang previously presented herein (see FIGS. 30–34) and includes a common middle section 144 and a leading tang 140 and trailing tang 142. However, in this preferred embodiment of the tandem tang 226, each end of the blank 228 includes a bend line 158 and a second bend line 229. The blank 228 will be bent at the bend lines 158 to form the leading tang 140 and trailing tang 142. Preferably, the blank 228 is bent at 30 degrees at bend lines 158. The blank 228 will be also be bent at the second bend lines 229 to form a first end leg 230 and a second end leg 232. The bottom half of the blank 228 will be bent by angle $\theta_1$ at the bottom halves of second bend lines 229 to form first end legs 230 on each of the leading tang 140 and trailing tang 142 and the top half of the blank 228 will be bent by angle $\theta_2$ at each of the top halves of second bend lines 229 to form second end legs 232 on each of the leading tang 140 and trailing tang 142. Thus both the leading tang 140 and trailing tang 142 will have end legs 230 and 232, which are preferably directed $\theta_3$ degrees apart. Most preferably, first end legs 230 are bent at an angle $\theta_1$ of 50 degrees with respect to the tangs 140 and 142, second end legs 230 are bent at an angle $\theta_2$ of 30 degrees with respect to the tangs 140 and 142, and the first end leg 230 and second end leg 232 will therefore be at an angle $\theta_3$ of 20 degrees apart.

Figure 37:
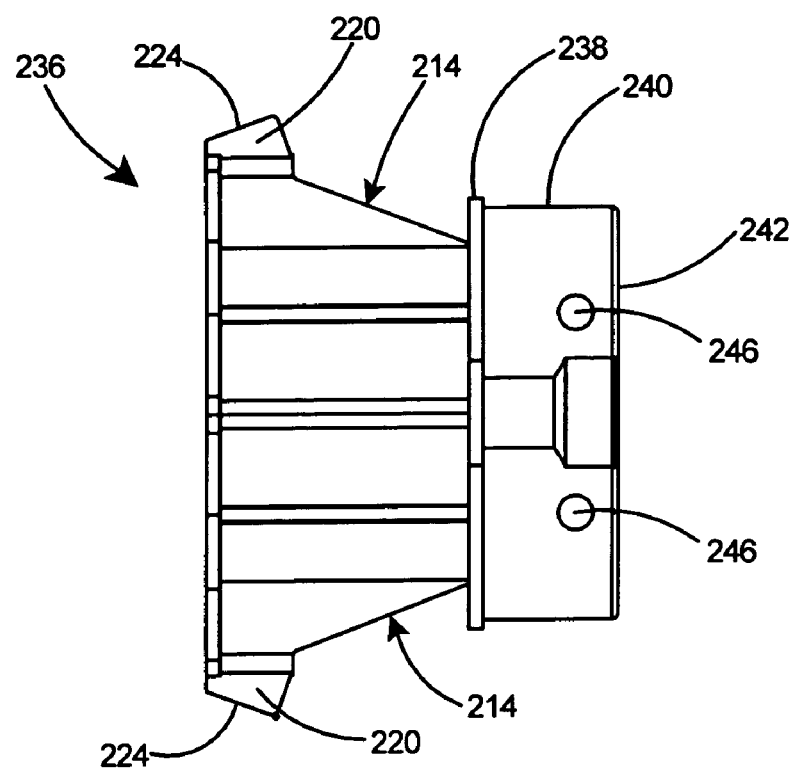
FIG. 37 is a top view of a trailing body portion of the connector body of FIG. 35.
Figure 38:
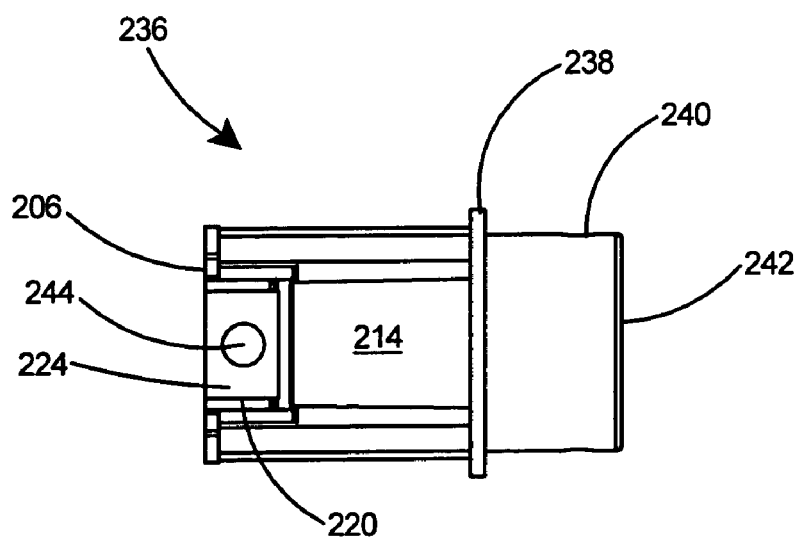
FIG. 38 is a side view of the trailing body portion of FIG. 37.

Referring to FIGS. 35–36, the connector body 202 of the duplex electrical connector 200 includes a leading body portion 234 and a trailing body portion 236. As shown in FIGS. 37 and 38, the trailing body portion 236 includes the open channels 214, the bridges 220 spanning each of the open channels 214, and the inclined surface 224 on the bridge 220. The trailing body portion 236 further includes a flange 238, a forward nose 240, a leading edge 242, and an aperture 244 in the inclined surface 224. Two forward view ports 246 are provided on the forward nose 240.

Figure 39:
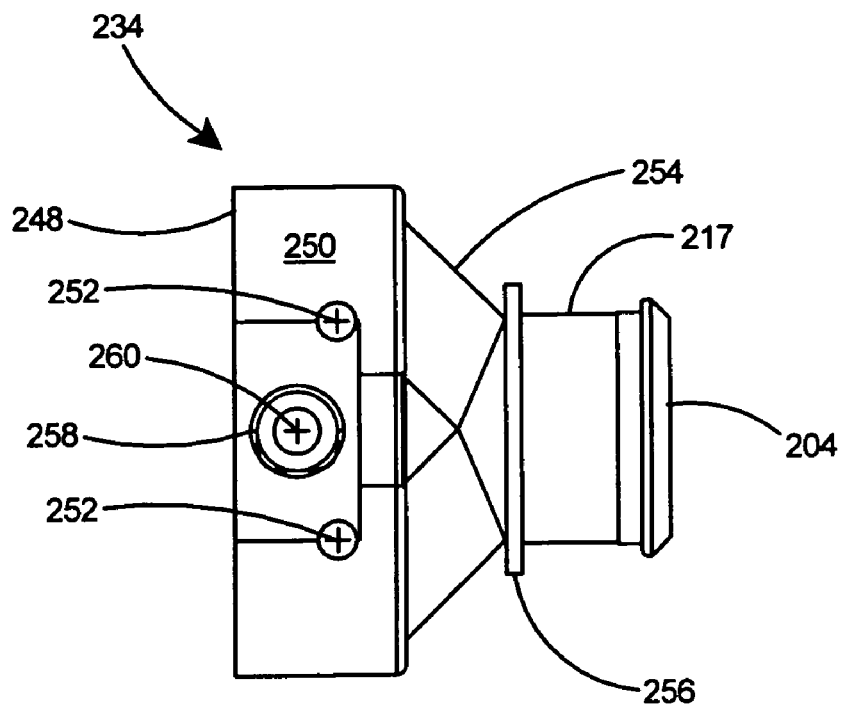
FIG. 39 is a top view of a leading body portion of the connector body of FIG. 35.
Figure 40:
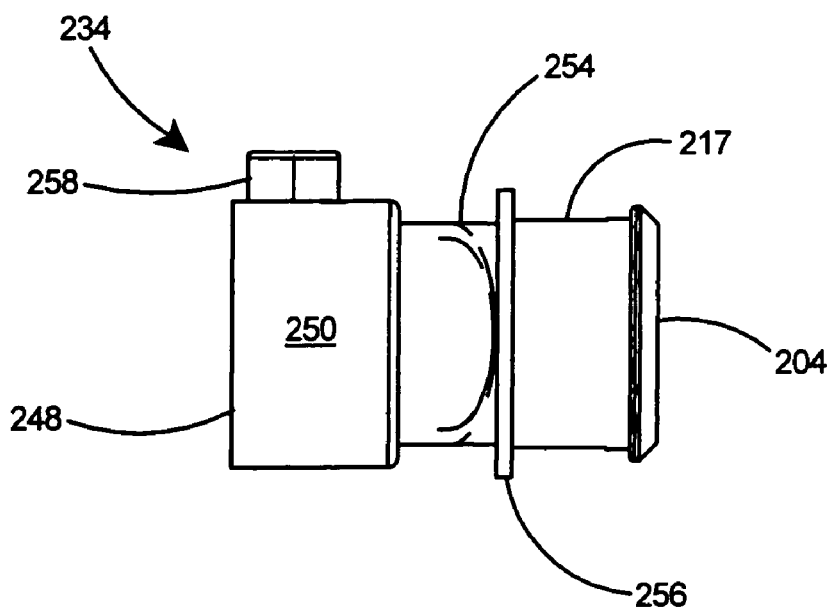
FIG. 40 is a side view of the leading body portion of FIG. 39.

With reference to FIGS. 39–40, the leading body portion 234 includes a trailing edge 248, a skirt 250, two rearward view ports 252, and a midsection 254 that narrows down to meet a forward flange 256 which in turn joins the cylindrical nose portion 217 of the connector body. The leading body portion 234 further includes a boss 258 extending from the skirt 250 that includes a threaded aperture 260.

Figure 41:
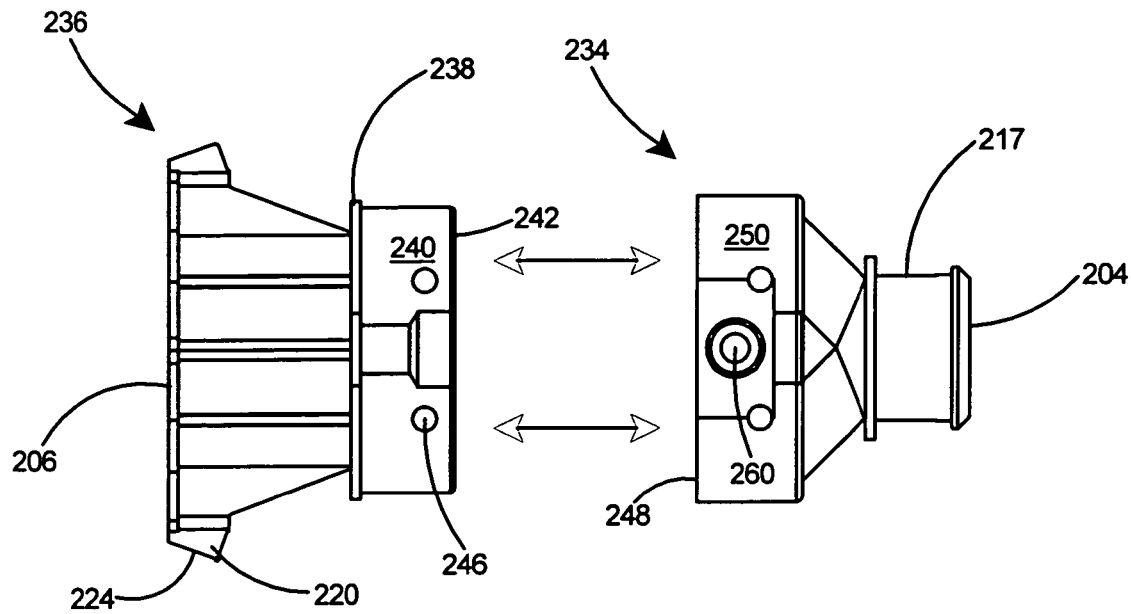
FIG. 41 is a top view of the leading and trailing body portions in alignment to be joined together to form a connector body according to the present invention.

With reference to FIGS. 41–42, pressing the forward nose 240 of the trailing body portion 236 into the skirt 250 of the leading body portion 234 forms the connector body 202 of the present invention. The leading body portion 234 and trailing body portion 236 are secured together by tightening a fastener 262 into the threaded aperture 260.

Figure 43:
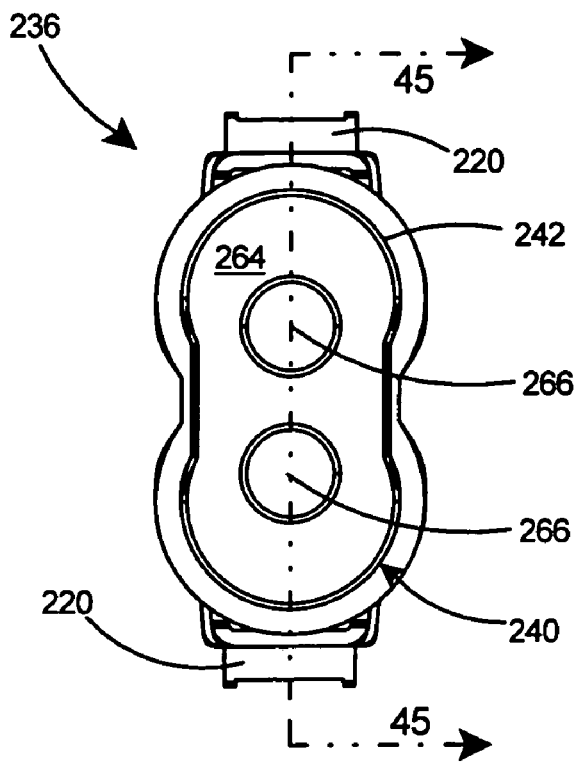
FIG. 43 is a front view of the trailing body portion of FIG. 37.
Figure 44:
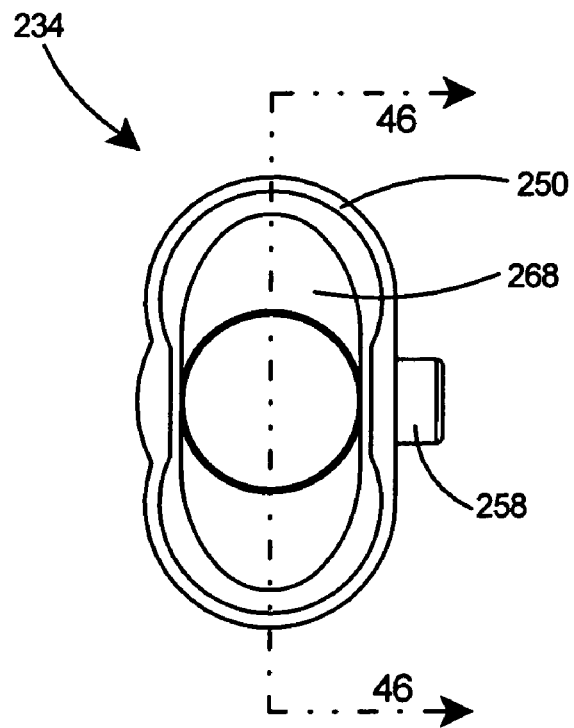
FIG. 44 is a rear view of the leading body portion of FIG. 39.

As shown in FIGS. 43 and 44, the leading edge 242 of the trailing body portion 236 includes a wall 264 having a pair of openings 266 therein. The skirt 250 of the leading body portion 234 includes a cavity 268 that is sized and shaped such that the forward nose 240 of the trailing body portion 236 will nest therein.

Figure 45:
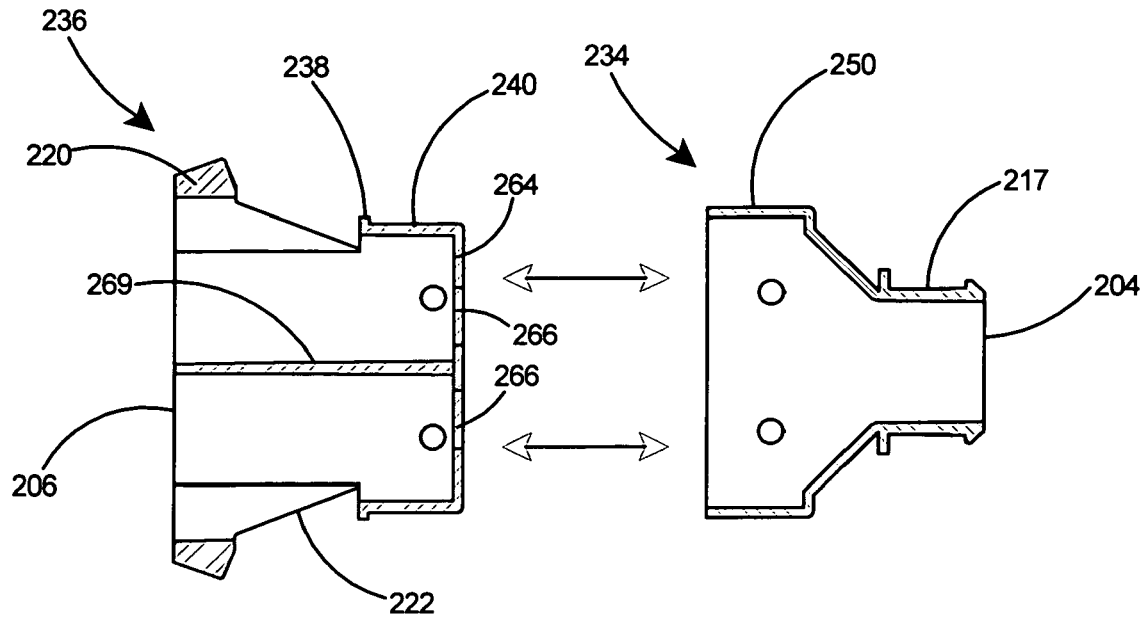
FIG. 45 is a sectional view of the leading and trailing body portions in alignment to be joined together to form a connector body according to the present invention.

With reference to FIGS. 45 and 46, sectional views are shown of the leading 234 and trailing 236 body portions in alignment to be joined together to form the connector body 202 of the present invention. The forward nose 240 of the trailing body portion 236 nests within the skirt 250 of the leading body portion 234 to form the connector body 202. A longitudinal wall 269 divides the trailing body portion 236 and forms the trailing openings 212 at the trailing end 206.

Figure 47:
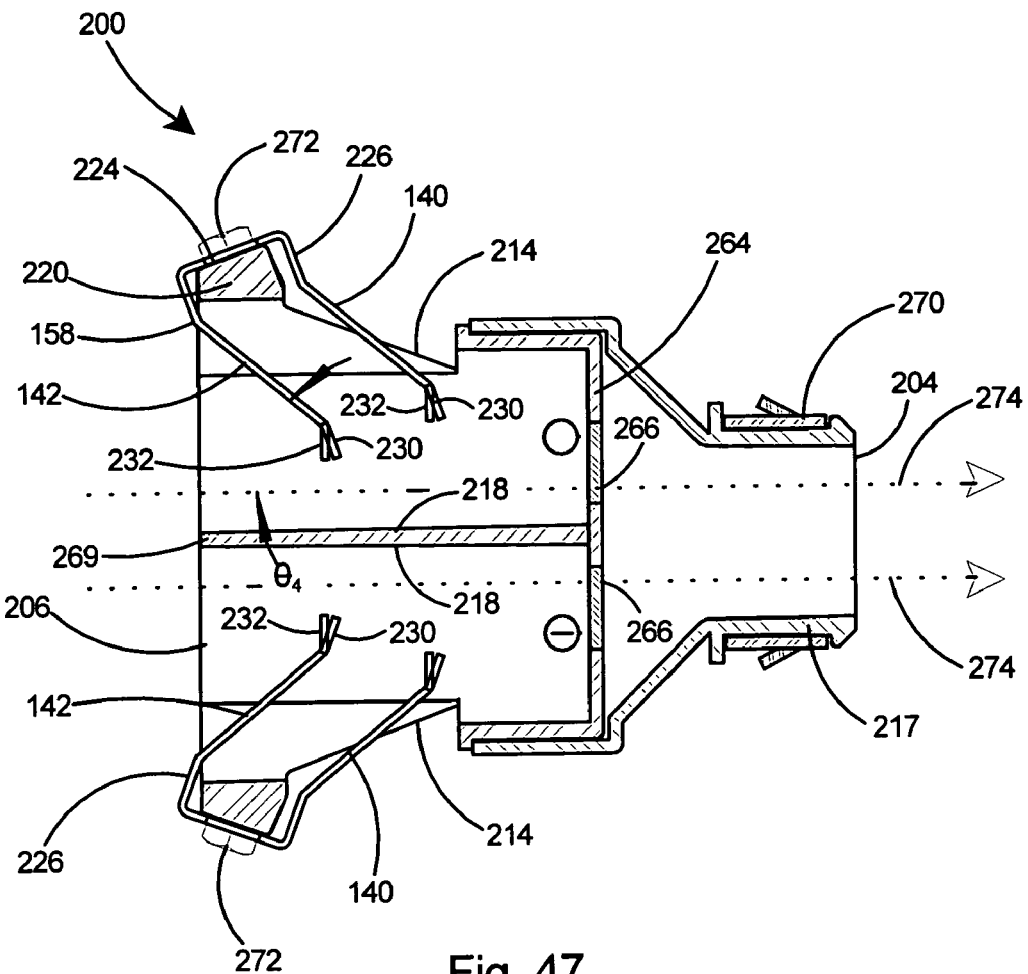
FIG. 47 is a sectional view of the electrical fitting of the present invention.

Referring to FIG. 47, securing a tandem tang 226 to each of the bridges 220 that span the open channels 214 and snapping an attachment arrangement such as a snap ring 270 onto the cylindrical nose portion 217 completes the assembly of the electrical fitting 200. A fastener 272 secures the tandem tangs 226 to the bridge 220. The inclined surface 224 of the bridge 220, combined with the bend of the leading tang 140 and the trailing tang 142 at the first bend line 158, positions each of the tangs 140, 142 at an angle $\theta_4$ with respect to the expected path or axis 274 that a cable (not shown) will take through the electrical fitting 200. Orienting the tangs at angle $\theta_4$ with respect to the cable axis 274 enables tangs 140, 142 of increased length over conventional snap fit connectors. Preferably angle $\theta_4$ is between 10 and 30 degrees. Most preferably, angle $\theta_4$ is 20 degrees. The longer tangs 140, 142 enhance their flexibility as they are cantilevered over a longer distance. The large open channels 214 provide substantial space to allow the tangs 140, 142 to flex outwardly of the cable axis 274 and thereby enable the duplex fitting 200 to accommodate a wide range of cables sizes. The first end leg 230 and second end leg 232 are oriented toward the cable axis 274 and will therefore engage a cable when it is inserted therein and force the cable toward the channel bottoms 218 in each of the open channels 214.

Figure 49:
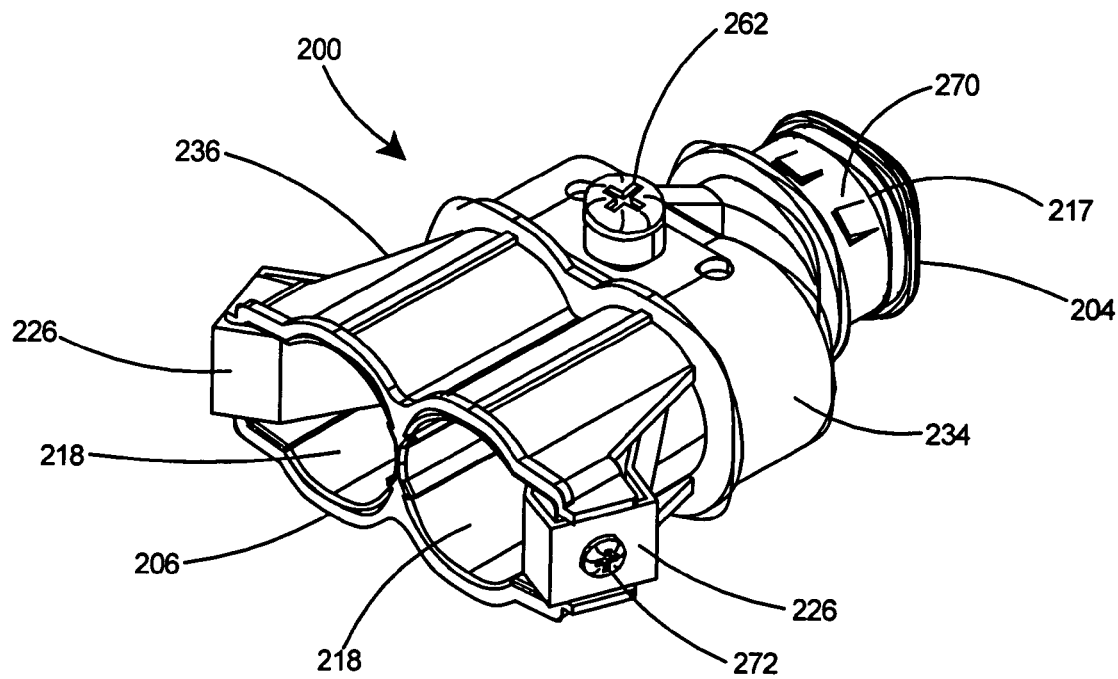
FIG. 49 is a perspective view from the trailing end of the preferred embodiment of an electrical fitting according to the present invention.

For an understanding of the operation of the duplex electrical fitting 200, reference is made to FIGS. 48 and 49. The duplex electrical fitting 200 is provided in one integral piece as shown in FIG. 49, with the snap ring 270 secured to the nose portion 217, the tandem tangs 226 secured to the inclined surface 224 of the bridges 220, and the leading and trailing body portions 234 and 236 secured together by fastener 262. The leading end 204 of the duplex fitting 200 is pressed into an appropriately sized knockout hole (not shown) in a panel. Two cables 227 can then be connected to the trailing end 206 of the duplex fitting 200 by inserting each of the cables 227 into one of the respective trailing openings 212 on the duplex electrical fitting 200. As shown in FIG. 48, the leading tang 140 and trailing tang 142 engage successive grooves 278 in each of the cables 227. The holding ability of the tangs 140, 142 is enhanced by the tangs being arranged to engage the cable 227 in a back to back manner with respect to the grooves 278 in the cable 227. As a result of the tangs 140, 142 being constructed of spring steel, the first and second end legs 230 and 232 strongly force the cables 227 against the bottom 218 of each open channel 214. As a result of forcing the cables 227 against the bottom 218, the opposite side of the cable 227 contacts the longitudinal wall 269. By providing two end legs 230 and 232 oriented at 20 degrees apart, additional surface contact is created against the cable surface. Further enhancement of the surface contact of the tangs against the cable 227 is achieved by providing a semicircular notch 102 (see FIG. 51) at the engagement end of the end legs 230, 232. The semicircular notch 102 has a curvature approximating the expected curvature of the cable groove 278. Therefore, as shown in FIG. 48, the two end legs 230 and 232 provide contact virtually along their entire lower edges 102 and apply the contact to the cable surface on both sides of the groove 278. As a net result, the duplex electrical connector 200 of the present invention provides an exceptional grip on the inserted cables. Preferably the radius of curvature of the semicircular notch 102 (see FIG. 51) is between 0.29 and 0.33 inch.

With reference to FIG. 41, the leading body portion 234 and trailing body portion 236 may each be molded in one piece of a suitable plastic or cast of metal. The tandem tang is preferably constructed of spring steel. The duplex electrical fitting may further include a tubular insert 84 such as that shown in FIGS. 8 and 9 to protect the outer sheaths of any wiring (not shown) that is later advanced through the electrical fitting.

As shown in FIG. 48, the duplex electrical fitting 200 with a snap ring 270 on the leading end 204 provides a larger leading opening 210 than is generally available with prior art electrical fittings utilizing frustoconical snap rings (not shown). The larger leading opening 210 allows much easier insertion of cables 227 through the fitting 200. As a result of the large leading opening 210 and the tandem tangs 226 being secured to the exterior of the duplex electrical fitting 200, a straight-through path is available for insertion of each of the two cables 227. Thus the electrical cables 227 and their electrical leads or wires 280 are easily inserted into the duplex fitting 200 without obstruction. As a result of the pair of openings 266 in the wall 264 at the leading end of the trailing body portion 236, the cables 227 and electrical leads 280 are guided to the leading opening 210. The tandem tangs 226 force the cables 227 against the bottom 218 of the open channel 214 and thereby ensure that the electrical cables 227 and wires 280 are in alignment with the leading opening 210. Prior art fittings utilizing frustoconical snap rings greatly reduce the diameter of the leading opening thereby causing an obstruction to any cables being inserted therein as a result of the necked down shoulder and the small leading opening. The cylindrical nose portion 217 on the leading end 204 allows larger diameter hole than on prior art fittings having frustoconical snap rings. As a result of the large open channels 214, the exterior attachment of the tandem tangs 226, the longer length and enhanced range of flexing available to the tangs 140 and 142, and the large leading opening 210, it is significantly easier to insert cable through the fitting of the present invention versus prior art fittings utilizing frustoconical snap rings. The leading opening 210 of the duplex electrical fitting 200 is circular in shape and is at least 0.59 inch in diameter.

Figure 47A:
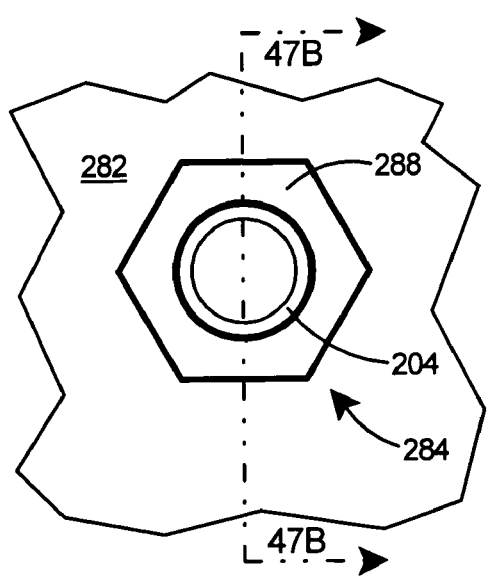
FIG. 47A is a front view of an electrical fitting having an alternative attachment arrangement including a threaded nose portion and a locknut for securing the electrical fitting to a panel or electrical box.
Figure 47B:
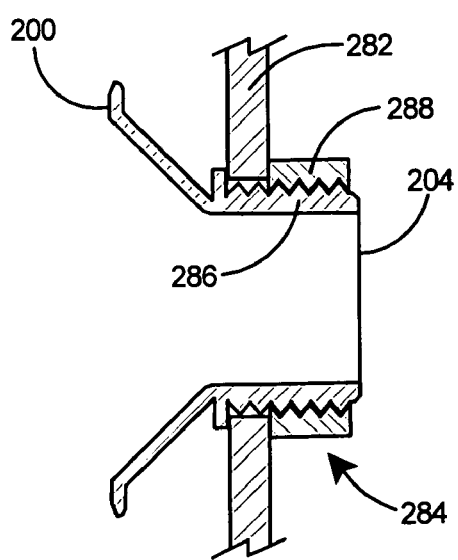
FIG. 47B is a sectional view taken along line 47B—47B of the threaded nose portion and locknut of FIG. 47A.

With reference to FIGS. 47A and 47B, in addition to the snap ring 270 shown in FIG. 47, the leading end 204 of the electrical fitting 200 can be secured to an electrical box or electrical panel 282 by an alternative attachment arrangement 284 consisting of a threaded nose portion 286 on the electrical fitting and a locknut 288.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A duplex electrical fitting for connecting electrical cables to a hole in a panel comprising:
    a connector body including a leading end, a trailing end, and a sidewall;
    said leading end of said connector body including a leading opening;
    said trailing end of said connector body including two trailing openings therein;
    a midportion intermediate said leading end and said trailing end of said connector body;
    an open channel extending through said sidewall into each of said trailing openings at said trailing end of said connector body;
    said open channels extending from said trailing opening to said midportion, said open channels including a bottom therein;
    an attachment arrangement on said leading end of said connector body;
    a bridge adjacent said trailing opening bridging said open channel, and
    a tandem tang secured to said bridge.

2. The electrical fitting of claim 1 including two ramps extending outwardly and rearwardly from said midportion of said connector body to provide support for said bridge.

3. The duplex electrical fitting of claim 1 wherein said tandem tang includes
    a leading tang;
    a trailing tang; and
    a common middle section.

4. The duplex electrical fitting of claim 3 wherein said bridge includes an inclined surface for receiving and attaching said tandem tang at said common middle section.

5. The duplex electrical fitting of claim 1 wherein said leading end of said connector body includes a cylindrical nose portion thereon.

6. The duplex electrical fitting of claim 1 wherein
    said leading opening is circular in shape; and
    said leading opening is at least 0.59 inch in diameter.

7. The duplex electrical fitting of claim 1 wherein said attachment arrangement is a snap fitting.

8. The duplex electrical fitting of claim 1 wherein said attachment arrangement includes
    a threaded nose portion on said leading end of said connector body; and
    a lock nut for engaging said threaded nose portion.

9. A duplex electrical fitting for connecting electrical cables to a hole in a panel or an electrical box comprising:
    a leading body portion having a leading end and a trailing end;
    a trailing body portion having a leading end and a trailing end;
    said leading body portion secured to said trailing body portion to form a connector body;
    a central longitudinal wall dividing said trailing body portion into two trailing openings;
    a tandem tang secured on said connector body outward of each of said trailing openings;
    a transverse wall at said leading end of said trailing body portion; and
    a pair of openings in said transverse wall;
    whereby said tandem tang forces an electrical cable inserted within one of said trailing openings against said longitudinal wall and locks it therein.

10. The duplex electrical fitting of claim 9 including an attachment arrangement on said leading end of said leading body portion.

11. The duplex electrical fitting of claim 10 wherein said attachment arrangement on said leading end of said leading body portion is a snap fitting.

12. The duplex electrical fitting of claim 10 wherein said attachment arrangement includes a threaded nose portion on said leading end of said leading body portion; and a lock nut for engaging said threaded nose portion.

13. The duplex electrical fitting of claim 9 including a midportion at the juncture of said leading body portion and said trailing body portion when secured together to form said connector body.

14. The duplex electrical fitting of claim 13 including an open channel at said trailing end of said trailing body portion, said open channel extending from each of said trailing openings to said midportion.

15. The duplex electrical fitting of claim 14 including a bottom in said open channel.

16. The duplex electrical fitting of claim 9 wherein said tandem tang includes a leading tang, a trailing tang, and a common middle section.

17. The duplex electrical fitting of claim 16 wherein
said leading tang is bent at a right angle at one side of said common middle section; and
said trailing tang is bent at a right angle at a second side of said common middle section.

18. The duplex electrical fitting of claim 16 wherein
said leading tang and said trailing tang include a bend line;
said leading tang and said trailing tang are bent at a 30 degree angle at said bend line.

19. The duplex electrical fitting of claim 16 wherein
said leading tang and said trailing tang include a second bend line having a first half and a second half;
said leading tang and said trailing tang are bent at a first angle at said first half of said second bend line to form a first end leg; and
said leading tang and said trailing tang are bent at a second angle at said second half of said second bend line to form a second end leg.

20. The duplex electrical fitting of claim 19 wherein
said first angle of said leading tang and said trailing tang is 50 degrees; and
said second angle of said leading tang and said trailing tang is 30 degrees.

21. The duplex electrical fitting of claim 19 wherein said first end leg and said second end leg are at an angle of 20 degrees with respect to one another.

22. The duplex electrical fitting of claim 19 wherein said leading tang and said trailing tang are oriented at an angle of between 10 and 30 degrees with respect to the central axis of a cable inserted therein in one of said trailing openings.

23. The duplex electrical fitting of claim 9 wherein each of said openings in said transverse wall are in alignment with one of said trailing openings in said connector body.

* * * * *